United States Patent
Cappiello et al.

(10) Patent No.: US 6,594,415 B1
(45) Date of Patent: Jul. 15, 2003

(54) WAVELENGTH DIVISION MULTIPLEXING/ DEMULTIPLEXING DEVICES EMPLOYING PATTERNED OPTICAL COMPONENTS

(75) Inventors: Gregory G. Cappiello, Windham, NH (US); Robert H. Dueck, Santa Ana, CA (US)

(73) Assignee: Confluent Photonics Corporation, Salem, NH (US)

( * ) Notice: Subject to any disclaimer, the term of this patent is extended or adjusted under 35 U.S.C. 154(b) by 0 days.

(21) Appl. No.: 09/903,613

(22) Filed: Jul. 13, 2001

Related U.S. Application Data

(63) Continuation-in-part of application No. 09/545,826, filed on Apr. 10, 2000, now Pat. No. 6,415,073.

(51) Int. Cl.[7] .............................. G02B 6/28; G02B 6/42; G02B 6/12; G02B 6/10; H04J 14/02
(52) U.S. Cl. .............................. 385/24; 385/14; 385/15; 385/31; 385/33; 385/37; 385/47; 385/129; 385/130; 359/124; 359/127; 359/130; 359/131
(58) Field of Search ............................... 385/1, 2, 3, 14, 385/15, 31, 33, 34, 36, 37–39, 42, 47, 24, 129–132, 35; 359/124, 130, 131, 127, 140, 669; 356/328; 623/17.17

(56) References Cited

U.S. PATENT DOCUMENTS

| | | | |
|---|---|---|---|
| 4,111,524 A | * | 9/1978 | Tomlinson, III ............. 385/37 |
| 4,153,330 A | * | 5/1979 | Tomlinson, III ............. 385/35 |
| 4,198,117 A | * | 4/1980 | Kobayashi .................. 385/37 |
| 4,274,706 A | * | 6/1981 | Tangonan .................... 385/37 |
| 4,279,464 A | * | 7/1981 | Colombini ................... 385/14 |
| 4,299,488 A | * | 11/1981 | Tomlinson, III ........... 356/328 |
| 4,343,532 A | * | 8/1982 | Palmer ........................ 385/36 |
| 4,387,955 A | * | 6/1983 | Ludman et al. ............. 385/37 |
| 4,479,697 A | * | 10/1984 | Kapany et al. ............... 385/33 |
| 4,522,462 A | * | 6/1985 | Large et al. ................. 385/37 |
| 4,583,820 A | * | 4/1986 | Flamand et al. ............. 385/37 |
| 4,622,662 A | * | 11/1986 | Laude et al. ................ 359/130 |
| 4,626,069 A | * | 12/1986 | Dammann et al. .......... 359/569 |
| 4,634,215 A | | 1/1987 | Reule ....................... 350/96.16 |
| 4,636,215 A | * | 1/1987 | Schwartz ................. 623/17.17 |
| 4,643,519 A | * | 2/1987 | Bussard et al. .............. 385/37 |

(List continued on next page.)

FOREIGN PATENT DOCUMENTS

| | | |
|---|---|---|
| EP | 0836103 | 4/1998 |
| EP | 0859249 | 8/1998 |

OTHER PUBLICATIONS

G. R. Harrison, Ph.D., Sc.D. et al., Practical Spectroscopy, Chapter 4—Diffraction–Grating Spectrographs, Prentice–Hall (1948).

(List continued on next page.)

*Primary Examiner*—Evelyn A Lester
*Assistant Examiner*—Jack Dinh
(74) *Attorney, Agent, or Firm*—Hunton & Williams

(57) ABSTRACT

Improved wavelength division multiplexing/demultiplexing devices are disclosed. In the case of an improved wavelength division multiplexing device having a diffraction grating for combining a plurality of narrowband optical beams into a multiplexed, polychromatic optical beam, wherein the plurality of narrowband optical beams are received from a corresponding plurality of optical sources and the multiplexed, polychromatic optical beam is transmitted to a corresponding optical receiver, the improvement comprises employing a plurality of patterned optical input components corresponding to the plurality of narrowband optical beams and the plurality of optical sources for introducing a first patterned phase delay into the plurality of narrowband optical beams, wherein each of the plurality of patterned optical input components has an effective focal length such that each of the plurality of optical sources is disposed substantially inside the effective focal length of a corresponding one of the plurality of patterned optical input components. The improvement also comprises similarly employing a patterned optical output component for introducing a second patterned phase delay into the multiplexed, polychromatic optical beam.

76 Claims, 15 Drawing Sheets

U.S. PATENT DOCUMENTS

| | | | | |
|---|---|---|---|---|
| 4,652,080 A | * | 3/1987 | Carter et al. | 385/47 |
| 4,671,607 A | * | 6/1987 | Laude | 359/130 |
| 4,703,472 A | * | 10/1987 | Blumentritt et al. | 359/130 |
| 4,708,425 A | * | 11/1987 | Gouali et al. | 359/131 |
| 4,726,645 A | * | 2/1988 | Yamashita et al. | 385/35 |
| 4,740,951 A | * | 4/1988 | Lizet et al. | 359/130 |
| 4,741,588 A | * | 5/1988 | Nicia et al. | 385/37 |
| 4,744,618 A | * | 5/1988 | Mahlein | 385/37 |
| 4,746,186 A | * | 5/1988 | Nicia | 385/14 |
| 4,748,614 A | * | 5/1988 | Dammann et al. | 359/130 |
| 4,749,247 A | * | 6/1988 | Large | 359/130 |
| 4,752,108 A | * | 6/1988 | Vollmer | 385/14 |
| 4,760,569 A | * | 7/1988 | Mahlein | 359/114 |
| 4,763,969 A | * | 8/1988 | Khoe et al. | 385/37 |
| 4,773,063 A | * | 9/1988 | Hunsperger et al. | 359/130 |
| 4,786,133 A | | 11/1988 | Gidon et al. | 350/96.19 |
| 4,819,224 A | | 4/1989 | Laude | 370/3 |
| 4,834,485 A | | 5/1989 | Lee | 350/96.19 |
| 4,836,634 A | | 6/1989 | Laude | 350/96.19 |
| 4,857,726 A | | 8/1989 | Kinney et al. | 250/226 |
| 4,923,271 A | | 5/1990 | Henry et al. | 350/96.19 |
| 4,926,412 A | | 5/1990 | Jannson et al. | 370/3 |
| 4,930,855 A | | 6/1990 | Clark et al. | 350/96.19 |
| 4,934,784 A | | 6/1990 | Kapany et al. | 350/96.18 |
| 5,026,131 A | | 6/1991 | Jannson et al. | 350/3.7 |
| 5,107,359 A | | 4/1992 | Ohuchida | 359/124 |
| 5,170,451 A | | 12/1992 | Ohshima | 385/43 |
| 5,228,103 A | | 7/1993 | Chen et al. | 385/14 |
| 5,278,687 A | | 1/1994 | Jannson et al. | 359/125 |
| 5,355,237 A | | 10/1994 | Lang et al. | 359/130 |
| 5,363,220 A | | 11/1994 | Kuwayama et al. | 359/3 |
| 5,440,416 A | | 8/1995 | Cohen et al. | 359/127 |
| 5,442,472 A | | 8/1995 | Skrobko | 359/110 |
| 5,450,510 A | | 9/1995 | Boord et al. | 385/37 |
| 5,457,573 A | | 10/1995 | Iida et al. | 359/569 |
| 5,500,910 A | | 3/1996 | Boudreau et al. | 385/24 |
| 5,513,289 A | | 4/1996 | Hosokawa et al. | 385/33 |
| 5,526,155 A | | 6/1996 | Knox et al. | 359/130 |
| 5,541,774 A | | 7/1996 | Blankenbecler | 359/653 |
| 5,555,334 A | | 9/1996 | Ohnishi et al. | 385/93 |
| 5,583,683 A | | 12/1996 | Scobey | 359/127 |
| 5,600,486 A | | 2/1997 | Gal et al. | 359/569 |
| 5,606,434 A | | 2/1997 | Feldman et al. | 359/3 |
| 5,657,406 A | | 8/1997 | Ball | 385/24 |
| 5,682,255 A | | 10/1997 | Friesem et al. | 359/15 |
| 5,703,722 A | | 12/1997 | Blankenbecler | 359/653 |
| 5,742,416 A | | 4/1998 | Mizrahi | 359/134 |
| 5,745,270 A | | 4/1998 | Koch | 359/124 |
| 5,745,271 A | | 4/1998 | Ford et al. | 359/130 |
| 5,745,612 A | | 4/1998 | Wang et al. | 385/24 |
| 5,748,350 A | | 5/1998 | Pan et al. | 359/130 |
| 5,748,815 A | | 5/1998 | Hamel et al. | 385/37 |
| 5,768,450 A | | 6/1998 | Bhagavatula | 385/24 |
| 5,777,763 A | | 7/1998 | Tomlinson, III | 359/130 |
| 5,880,834 A | | 3/1999 | Chrisp | 356/328 |
| 6,011,884 A | | 1/2000 | Dueck et al. | 385/24 |
| 6,084,695 A | | 7/2000 | Martin et al. | 359/131 |
| 6,108,471 A | | 8/2000 | Zhang et al. | 385/37 |
| 6,415,073 B1 | * | 7/2002 | Cappiello et al. | 385/24 |

OTHER PUBLICATIONS

W. J. Tomlinson, Wavelength multiplexing in multimode optical fibers, Applied Optics, vol. 16, No. 8 (Aug. 1977).

W.J. Tomlinson et al., Optical multiplexer for multimode fiber transmission systems, Appl. Phys. Lett., vol. 31, No. 3 (Aug. 1977).

W. J. Tomlinson et al., Optical wavelength–division–multiplexer for the 1–1.4 µm spectral region, Electronics Letters, vol. 14, No. 11 (May 25, 1973).

T. Miki et al., Viabilities of the wavelength–division–multiplexing transmission system over an optical fiber cable, IEEE Transactions on Communications, vol. Com–26, No. 7 (Jul. 1978).

K. Aoyama et al., Optical demultiplexer for a wavelength division multiplexing system, Applied Optics, vol. 18, No. 8 (Apr. 15, 1979).

K. Aoyama et al., Low–loss optical demultiplexer for WDM system in the 0.8 µm wavelength region, Applied Optics, vol. 18, No. 16 (Aug. 15, 1979).

R. Watanabe et al., Optical Demultiplexer Using Concave Grating in 0.7–0.9 um Wavelength Region, Electronics Letters, vol. 16, No. 3 (Jan. 31, 1980).

K. Kobayashi et al., Microoptic Grating Multiplexers and Optical Isolators for Fibers–Optic Communications, Journal of Quantum Electronics, vol. QE–16, No. 1 (Jan. 1980).

Y. Fujii et al., Optical Demultiplexer Using a Silison Echelette Grating, IEEE Journal of Quantum Electronics, vol. QE–16, No. 2 (Feb. 1980).

W. J. Tomlinson, Applications of GRIN–rod lenses in optical fiber communication systems, Applied Optics, vol. 19, No. 7 (Apr. 1, 1980).

A. Nicia, Wavelength Multiplexing and Demultiplexing Systems for Singlemode and Multimode Fibers, Conference Proceedings, European Conference on Optical Communication (Sep. 8–11, 1981).

B.D. Metcalf et al., High–capacity wavelength demultiplexing with a large–diameter GRIN rod lens, Applied Optics, vol. 21, No. 5 (Mar. 1, 1982).

J. Lipson et al., Low–Loss Wavelength Division Multiplexing (WDM) Devices for Single–Mode Systems, Journal of Lightwave Technology, vol. LT–1, No. 2 (Jun. 1983).

G. Winzer, Wavelength Multiplexing Components—A Review of Single–Mode Devices and their Applications, Journal of Lightwave Technology, vol. LT–2, No. 4 (Aug. 1984).

H. Ishio et al., Review and Status of Wavelength–Division–Multiplexing Technology and Its Application, Journal of Lightwave Technology, vol. LT–2, No. 4 (Aug. 1984).

Y. Fujii et al., Optical Demultiplexer Utilizing an Ebert Mounting Silicon Grating, Journal of Lightwave Technology, vol. LT–2, No. 5 (Oct. 1984).

J. Lipson et al., A Four–Channel Lightwave Subsystem Using Wavelength Division Multiplexing, IEEE Journal of Lightwave Technology, vol. LT–3, No. 1 (Feb. 1985).

B. Hillerich et al., Wide Passband Grating Multiplexer for Multimode Fibers, Journal of Lightwave Technology, vol. LT–3, No. 3 (Jun. 1985).

J. Lipson et al., A Six–Channel Wavelength Multiplexer and Demultiplexer for Single Mode Systems, Journal of Lightwave Technology, vol. LT–3, No. 5 (Oct. 1985).

I. Nishi et al., Broad Passband Multi/Demultiplexer for Multimode Fibers Using a Diffraction Grating and Retroreflectors, Journal of Lightwave Technology, vol. LT–5, No. 12 (Dec. 1987).

B. Moslehi et al., Fiber–optic wavelength–division multiplexing and demultiplexing using volume holographic gratings, Optics Letters, vol. 14, No. 19 (Oct. 1, 1989).

Y. Huang et al., Wavelength–division–multiplexing and – demultiplexing by using a substrate–mode grating pair, Optics Letters, vol. 17, No. 22 (Nov. 15, 1992).

M. Wu et al., Design Considerations for Rowland Circle Grating Used in Photonic Integrated Devices for WDM Applications, Journal of Lightwave Technology, vol. 12, No. 11 (Nov. 1994).

A. Stavdas et al., Design of a holographic concave grating used as a multiplexer/demultiplexer in dense wavelength-routed optical networks with subnanometer channel spacing, Journal of Modern Optics, vol. 42, No. 9, pp. 1863–1874 (Sep. 1995).

C. Zhou et al., Four Channel Multimode Wavelength Division Demultiplexer (WDM) System Based on Surface–normal Volume Holographic Gratings and Substrate–guided Waves, SPIE, vol. 3288 (No date available).

A. Stavdas et al., Free–Space Aberration–Corrected Diffraction Grating Demultiplexer for Application in Densely–Spaced, Subnanometer Wavelength Routed Optical Networks, IEEE Electronic Letters, vol. 31, No. 16, pp. 1368–1370 (Aug. 1995).

D. Wisely, High performance 32 channel HDWDM multiplexer with 1nm channels spacing and 0.7nm bandwidth, SPIE, vol. 1578, Fiber Networks for Telephony and CATV (1991).

A. Cohen et al., Active management of 100–GHz–spaced WDM channels, Optical Fiber Communication Conference and the International Conference on Integrated Optics and Optical Fiber Communication, Technical Digest, Conference Edition (Feb. 24, 1999).

B. Keyworth et al., Low Loss, Temperature Stable Diffraction Grating Wavelength (DE) Multiplexer, National Fiber Optic Engineers Conference, Technical Proceedings, vol. I (Sep. 13–17, 1998).

M. Seki et al., 20–Channel Micro–Optic Grating Demultiplexer for 1.1–1.6um Band Using a Small Focusing Parameter Graded—Index Rod Lens, Electronics Letters, vol. 18, No. 6 (Mar. 18, 1992).

A. Koonen, A Compact Wavelength Demultiplexer Using Both Interference Filters and a Diffraction Grating, European Conference of Optical Communication, Conference Proceedings (Sep. 8–11, 1981).

J. Conradi et al., Laser Based WDM Multichannel Video Transmission System, Electronic Letters, vol. 17, No. 2 (Jan. 22, 1981).

J. Laude et al., Wavelength division multiplexing/demultiplexing (WDM) using diffraction gratings, SPIE, vol. 503, Application, Theory, and Fabrication of Periodic Structures (1984).

A. Livanos et al., Chirped–grating demultiplexers in dielectric waveguides, Applied Physics Letters, vol. 30, No. 10 (May 1977).

H. Obara et al., Star Coupler Based WDM Switch Employing Tunable Devices With Reduced Tunability Range, Electronic Letters, vol. 28, No. 13 (Jun. 1992).

A. Willner et al., 2–D WDM Optical Interconnections Using Multiple–Wavelength VCSEL's for Simultaneous and Reconfigurable Communication Among Many Planes, IEEE Phoyonics Technology Letters, vol. 5, No. 7 (Jul. 1993).

M. Wang et al., Five Channel Polymer Waveguide Wavelength Division Demultiplexer for the Near Infrared, IEEE Photonics Technology Letters, vol. 3, No. 1 (Jan. 1991).

M. Li et al., Two–channel surface–normal wavelength demultiplexer using substrate guided waves in conjunction with numtiplexed waveguide holograms, Appl. Phys. Lett., vol. 66, No. 3 (Jan. 1995).

J. Laude et al., Stimax, A Grating Multiplexer for Monomode or Multimode Fibers, Ninth European Conference on Optical Communication–ECOC83, Geneva, Switzerland (Oct. 23–26, 1983).

R. Watanabe et al., Optical Grating Multiplexer in the 1.1–1.5mm Wavelength Region, Electronics Letters, vol. 16, No. 3 (Jan. 31, 1980).

G.D. Khoe, New Integrated Subscriber Star Network Combining Maximum Versatility With Minimum Costs of Installation and Maintenance, European Conference on Optical Communication, Conference Proceedings, Copenhagen, Bella Center (Sep. 8–11, 1981).

T. Lingelsheim et al., Fabrication of micro–optical wavelength division multiplexer (WDM) gratings on glsas using an ion etching technique, SPIE vol. 503, Application, Theory, and Fabrication of Periodic Structures (1984).

D. Maystre et al., Optimization of wavelength demultiplexer in fiber optics using gold echelette gratings, SPIE vol. 503, Application, Theory, and Fabrication of Periodic Structures (1984).

D.R. Wisely, 32 Channel WDM Multiplexer with 1nm Channel Spacing and 0.7 nm Bandwidth, Electronics Letters, vol. 27, No. 6, pp. 520–521 (Mar. 14, 1991).

C. Koeppen, et al., High Resolution Fiber Grating Optical Network Monitor, National Fiber Optic Engineers Conference, Technical Proceedings, vol. II (Sep. 13–17, 1998).

M.J. Cohen, et al. InGaAs photodiode arrays for DWDM monitoring and receiving, Lightwave, pp. 99–101 (Aug. 1999).

J.P. Laude, Wavelength Division Multiplexing, pp. 116–117, (1993).

Sami Hendow, et al., Performance Monitors Enable Remote Channel Management, Lightwave Special Reports, pp. 62–66 and 72 (Feb. 2000).

Adrian Meldrum, C– and L–band Channel Monitoring, Lightwave Special Reports, pp. 68–72 (Feb. 2000).

S. Bourzeix et al., Athermalized DWDM Multiplexer/Demultiplexer, National Fiber Optic Engineers Conference, Technical Proceedings, Aug. 27–31, 2000.

Wisely, D. R., "32 Channel WDM Multiplexer With 1NM Channel Spacing and 0.7NM Bandwidth", Electronics Letters, IEE Stevenage, GB, vol. 27, No. 6, Mar. 14, 1991, pp. 520–521.

Laude, V., "Twisted–nematic liquid–crystal pixelated active lens", Optics Communications, North–Holland Publishing Co., vol. 153, No. 1–3, Jul. 15, 1998, pp. 134–152, ISSN: 0030–4018 (abstract).

PCT–International Search Report dated Apr. 11, 2002 for Application Ser. No. PCT/US01/11673, filed Apr. 10, 2001.

* cited by examiner

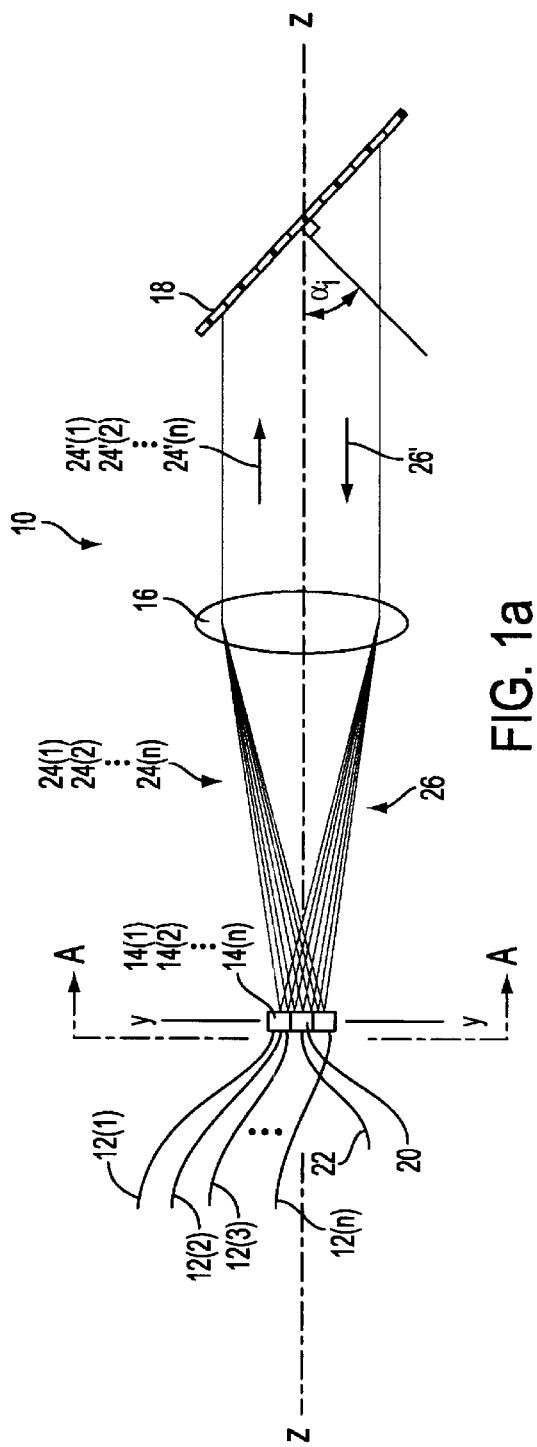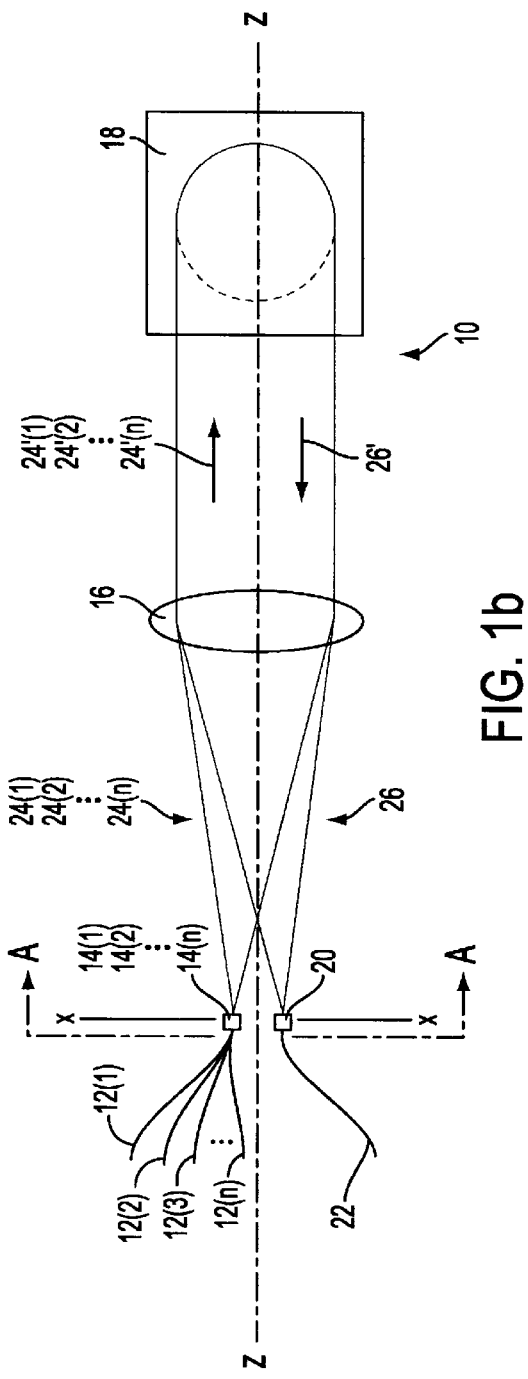

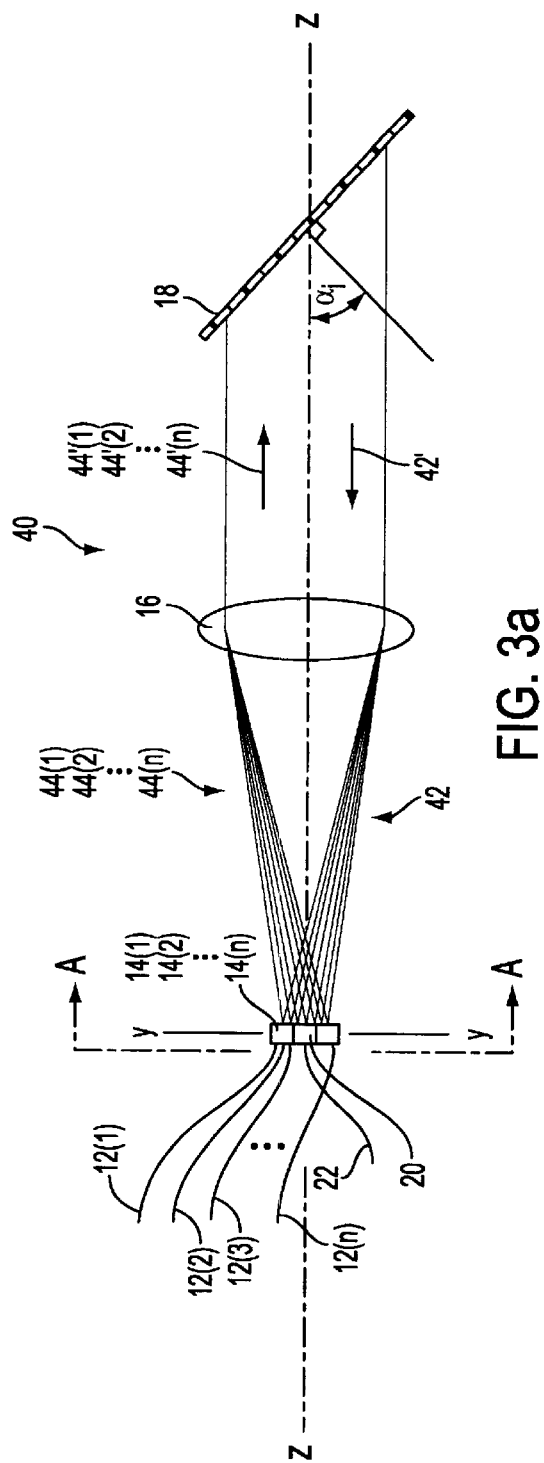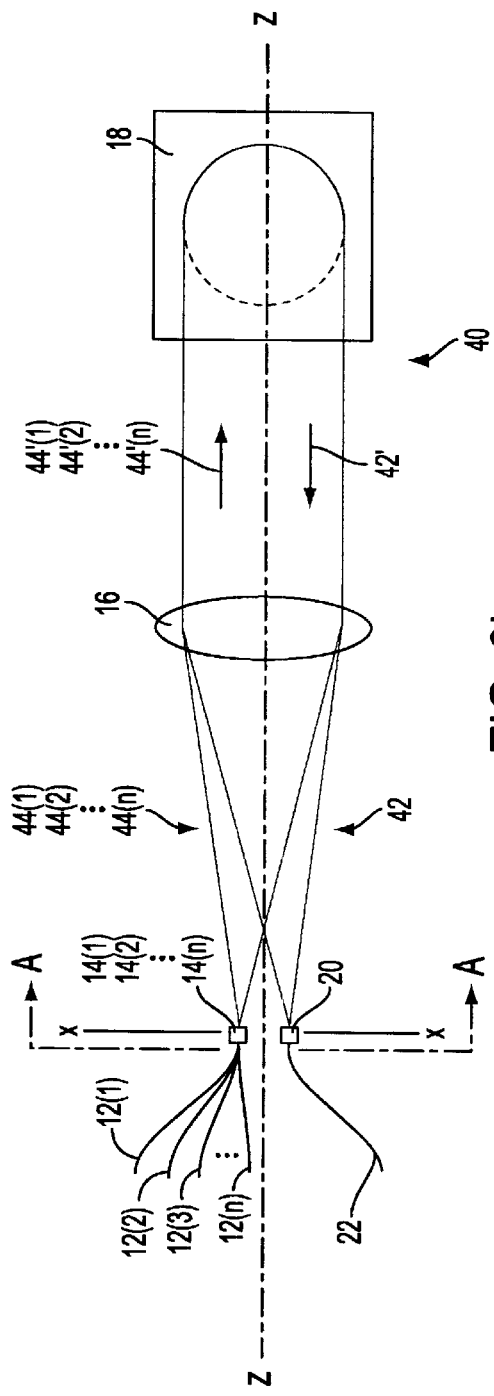

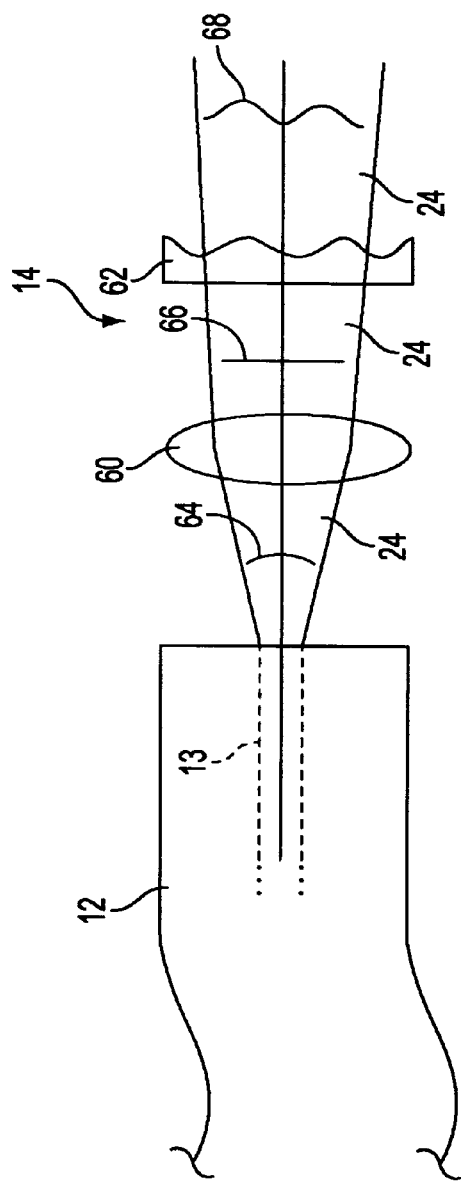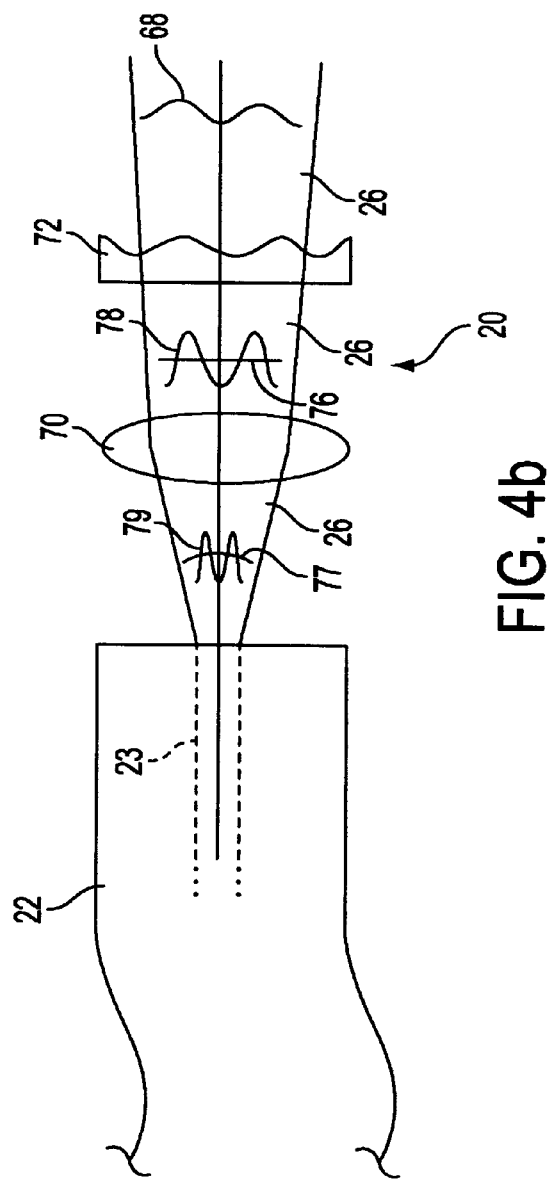

WAVELENGTH DIVISION MULTIPLEXING/ DEMULTIPLEXING DEVICES EMPLOYING PATTERNED OPTICAL COMPONENTS

CROSS-REFERENCE TO RELATED APPLICATIONS

This patent application is a continuation-in-part patent application of U.S. patent application Ser. No. 09/545,826, filed Apr. 10, 2000, now U.S. Patent (Attorney Docket No. 58020-000029, Client Reference No. D-99008), filed Apr. 10, 2000, which is hereby incorporated by reference herein in its entirety.

FIELD OF THE INVENTION

The present invention relates generally to wavelength division multiplexing and, more particularly, to wavelength division multiplexing/demultiplexing devices employing patterned optical components.

BACKGROUND OF THE INVENTION

Optical communication technology relies on wavelength division multiplexing (WDM) to provide increased bandwidth over existing installed fiber, as well as newly deployed fiber installations. Several technologies exist to provide the technical solution to WDM: array waveguide gratings (AWG's), fiber Bragg grating based systems, interference filter based systems, Mach-Zehnder interferometric based systems, and diffraction grating based systems, to name a few. Each system has advantages and disadvantages over the others.

Diffraction grating based systems have the advantage of parallelism, which yields higher performance and lower cost for high channel count systems. One drawback to traditional diffraction grating based systems, however, is an insertion loss that rises quickly and monotonically as the source illumination drifts off of the center of the desired communication channel wavelength. That is, traditional diffraction grating based systems invariably suffer from a variation in transmission efficiency across a wavelength channel. This variation in transmission efficiency with wavelength creates deleterious effects on modulated signals. For analog signals it creates harmonic distortion, for digital signals it increases the bit-error-rates at higher modulation bandwidths.

Also, most traditional diffraction grating based systems have an inherently gaussian-shaped passband profile. Such a gaussian-shaped passband profile is generally very narrow with a single peak and steep passband edges. Thus, even when a communication channel drifts off of its center wavelengths by only a slight amount, signal coupling with a receiving fiber is often severely detrimentally affected.

One attempt to alleviate at least one aspect of the above-described shortcomings is described by D. Wisely in "High Performance 32 Channel HDWDM Multiplexer with 1 nm Channel Spacing and 0.7 nm Bandwidth", SPIE, Vol. 1578, Fiber Networks for Telephony and CATV (1991). In this paper, Wisely suggests that a microlens may be employed at the end of an input fiber in a WDM device so as to widen the gaussian-shaped passband profile of the WDM profile. That is, by widening the gaussian-shaped passband profile of the WDM device, there is less susceptibility to wavelength drift in communication channels. However, widening the gaussian-shaped passband profile of a WDM device may increase the chances of channel crosstalk. Thus, a tradeoff determination must be made when deciding whether or not to implement the above-described technique of Wisely.

Another attempt to alleviate at least one aspect of the above-described shortcomings is described by Martin et al. in U.S. Pat. No. 6,084,695. In this patent, Martin et al. suggest that a converging lens array, which is disclosed to be a planar microlens array with an index gradient, may be used to increase the width of elementary bands, and thereby increase the ratio between the width of elementary bands and the distance separating the central wavelengths of adjacent elementary bands in a multiplexer/demultiplexer device. Each microlens in the planar microlens array corresponds to a respective input/output fiber, which is placed directly in the focal point of its corresponding microlens. Thus, the apparent diameter of a beam exiting/entering the core of an input/output fiber as seen by a dispersion element or grating of the multiplexer/demultiplexer devices is the diameter of the beam as it is incident upon a corresponding microlens, and not the actual diameter of the beam as it exits/enters the core of the input/output fiber. That is, the width of each elementary band as seen by the dispersion element or grating of the multiplexer/demultiplexer device is increased without increasing the distance separating the central wavelengths of adjacent elementary bands.

However, as with the Wisely reference described above, the widening of elementary passbands as disclosed by Martin et al. may increase the chances of channel crosstalk. Also, Martin et al. disclose that an additional fiber (not shown) is required once for each channel wavelength or once for the multiplexed output beam of the multiplexer/demultiplexer device to attenuate the peak of each passband and thereby flatten each passband. Furthermore, Martin et al. disclose that the spacing between the input/output fibers, as well as the spacing between microlenses, is equal so as to allow for a much simpler implementation of the multiplexer/demultiplexer device. However, Martin et al. additionally disclose that this equal spacing of the input/output fibers and the microlenses is achieved only through the use of a prism, which compensates for wavelength spacing non-linearity due to dispersion laws of the dispersion element or grating. Thus, a tradeoff determination and additional device complexities are encountered when deciding whether or not to implement the above-described multiplexer/demultiplexer device of Martin et al.

While no other known attempts have been made to alleviate one or more aspects of the above-described shortcomings, it is presumed that such other attempts, if made, would also require certain tradeoffs to be made and/or complexities to be added. Thus, in view of the foregoing, it would be desirable to provide a WDM device which overcomes the above-described inadequacies and shortcomings with minimal or no tradeoffs or additional complexities.

OBJECTS OF THE INVENTION

The primary object of the present invention is to provide wavelength division multiplexing/demultiplexing devices which overcome the above-described inadequacies and shortcomings with minimal or no tradeoffs or additional complexities.

The above-stated primary object, as well as other objects features, and advantages, of the present invention will become readily apparent to those of ordinary skill in the art from the following summary and detailed descriptions, as well as the appended drawings. While the present invention is described below with reference to preferred embodiment (s), it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

SUMMARY OF THE INVENTION

According to the present invention, improved wavelength division multiplexing/demultiplexing devices are provided. In the case of an improved wavelength division multiplexing device having a diffraction grating for combining a plurality of narrowband optical beams into a multiplexed, polychromatic optical beam, wherein the plurality of narrowband optical beams are received from a corresponding plurality of optical sources and the multiplexed, polychromatic optical beam is transmitted to a corresponding optical receiver, the improvement comprises employing a plurality of patterned optical input components corresponding to the plurality of narrowband optical beams and the plurality of optical sources for introducing a first patterned phase delay into the plurality of narrowband optical beams, wherein each of the plurality of patterned optical input components has an effective focal length such that each of the plurality of optical sources is disposed substantially inside the effective focal length of a corresponding one of the plurality of patterned optical input components. The improvement also comprises employing a patterned optical output component corresponding to the multiplexed, polychromatic optical beam and the optical receiver for introducing a second patterned phase delay into the multiplexed, polychromatic optical beam, wherein the patterned optical output component has an effective focal length such that the optical receiver is disposed substantially inside the effective focal length of the patterned optical output component. The first patterned phase delay and the second patterned phase delay are added so as to reshape the passband of the improved wavelength division multiplexing device.

In accordance with other aspects of the present invention, the effective focal length of each of the plurality of patterned optical input components may be the same. Also, the effective focal length of the patterned optical output component may be the same as the effective focal length of each of the plurality of patterned optical input components. Alternatively, the effective focal length of each of the plurality of patterned optical input components may differ. Also, the effective focal length of the patterned optical output component may differ from the effective focal length of each of the plurality of patterned optical input components. In any event, the effective focal length of each of the plurality of patterned optical input components is beneficially derived from a quadratic phase term that is inherent in each of the plurality of patterned optical input components. Similarly, the effective focal length of the patterned optical output component is beneficially derived from a quadratic phase term that is inherent in the patterned optical output component.

In accordance with further aspects of the present invention, at least some of the plurality of patterned optical input components and the patterned optical output component are beneficially formed on a common substrate.

In accordance with still further aspects of the present invention, the spacing between each of the plurality of optical source, as well as the spacing between each of the corresponding plurality of patterned optical input components, increases as the difference between the wavelengths associated with each of the plurality of narrowband optical beams being received from corresponding ones of the plurality of optical sources increases.

In accordance with still further aspects of the present invention, each of the plurality of optical sources may be, for example, an optical input fiber or a laser diode. If each of the plurality of optical sources is an optical input fiber, wherein each of the plurality of narrowband optical beams is received from a corresponding one of the plurality of optical input fibers, each of the plurality of optical input fibers is beneficially disposed from a corresponding one of the plurality of patterned optical input components at a distance defined by:

$$x = \frac{f}{2} + \frac{1}{4} \cdot \sqrt{4 \cdot f^2 - \frac{\pi^2 \cdot do^4}{\lambda^2}}$$

wherein f is the effective focal length of the corresponding one of the plurality of patterned optical input components, $d_o$ is a Gaussian mode field diameter of the optical input fiber, and $\lambda$ is the wavelength associated with the narrowband optical beam being received from the optical input fiber. Accordingly, the distance between each of the plurality of optical input fibers and each corresponding one of the plurality of patterned optical input components may vary with wavelength. Alternatively, the effective focal length of each of the plurality of patterned optical input components may differ so that the distance between each of the plurality of optical input fibers and each corresponding one of the plurality of patterned optical input component does not vary with wavelength.

In accordance with still further aspects of the present invention, the optical receiver is beneficially an optical output fiber, wherein the multiplexed, polychromatic optical beam is transmitted to the optical output fiber. The optical output fiber is beneficially disposed from the corresponding patterned optical output component at a distance defined by:

$$x = \frac{f}{2} + \frac{1}{4} \cdot \sqrt{4 \cdot f^2 - \frac{\pi^2 \cdot do^4}{\lambda^2}}$$

wherein f is the effective focal length of the corresponding patterned optical output component, $d_o$ is a Gaussian mode filed diameter of the optical output fiber, and $\lambda$ is the average wavelength associated with the multiplexed, polychromatic optical beam being transmitted to the optical output fiber.

In accordance with other aspects of the present invention, the plurality of patterned optical input components beneficially comprises a plurality of patterned phase masks for introducing the first patterned phase delay into the plurality of narrowband optical beams. Each of the plurality of patterned phase masks is preferably formed on/in a corresponding collimating microlens. Alternatively, the plurality of patterned optical input components also beneficially comprises a plurality of collimating microlenses for collimating the plurality of narrowband optical beams. In either case, each corresponding collimating microlens or each of the plurality of collimating mircolenses contributes to a widening of the passband of the improved wavelength division multiplexing device.

In accordance with further aspects of the present invention, each of the plurality of patterned phase masks beneficially has a periodic phase profile. A benefit to this aspect is that the passband of the improved wavelength division multiplexing device is typically a gaussian-shaped passband having a peak, and the periodic phase profile of each patterned phase mask contributes to a flattening of the peak of the gaussian-shaped passband of the improved wavelength division multiplexing device. Another benefit to this aspect is that the passband of the improved wavelength division multiplexing device is a guassian-shaped passband having sideband slopes, and the periodic phase profile of each patterned phase mask contributes to a steepening of the sideband slopes of the gaussian-shaped passband of the improved wavelength division multiplexing device.

In accordance with still further aspects of the present invention, each of the plurality of patterned phase masks beneficially has a non-periodic phase profile. A benefit to this aspect is that the passband of the improved wavelength division multiplexing device is a guassian-shaped passband having a peak, and the non-periodic phase profile of each patterned phase mask contributes to a flattening of the peak of the gaussian-shaped passband of the improved wavelength division multiplexing device. Another benefit to this aspect is that the passband of the improved wavelength division multiplexing device is a guassian-shaped passband having sideband slopes, and the non-periodic phase profile of each patterned phase mask contributes to a steepening of the sideband slopes of the guassian-shaped passband of the improved wavelength division multiplexing device.

In accordance with other aspects of the present invention, the patterned optical output component beneficially comprises a patterned phase mask for introducing the second patterned phase delay into the multiplexed, polychromatic optical beam. The patterned phase mask is preferably formed on/in a focusing microlens. Alternatively, the patterned optical output component also beneficially comprises a focusing microlens for focusing the multiplexed, polychromatic optical beam. In either case, the focusing microlens contributes to a widening of the passband of the improved wavelength division multiplexing device.

In accordance with further aspects of the present invention, the patterned phase mask beneficially has a periodic phase profile. A benefit to this aspect is that the passband of the improved wavelength division multiplexing device is a guassian-shaped passband having a peak, and the periodic phase profile of the patterned phase mask contributes to a flattening of the peak of the guassian-shaped passband of the improved wavelength division multiplexing device. Another benefit to this aspect is that the passband of the improved wavelength division multiplexing device is a guassian-shaped passband having sideband slopes, and the periodic phase profile of the patterned phase mask contributes to a steepening of the sideband slopes of the gaussian-shaped passband of the improved wavelength division multiplexing device.

In accordance with still further aspects of the present invention, the patterned phase mask beneficially has a non-periodic phase profile. A benefit to this aspect is that the passband of the improved wavelength division multiplexing device is a guassian-shaped passband having a peak, and the non-periodic phase profile of the patterned phase mask contributes to a flattening of the peak of the gaussian-shaped passband of the improved wavelength division multiplexing device. Another benefit to this aspect is that the passband of the improved wavelength division multiplexing device is a guassian-shaped passband having sideband slopes, and the non-periodic phase profile of the patterned phase mask contributes to a steepening of the sideband slopes of the gaussian-shaped passband of the improved wavelength division mutliplexing device.

In the case of an improved wavelength division demultiplexing device having a diffraction grating for separating a multiplexed, polychromatic optical beam into a plurality of narrowband optical beams, wherein the multiplexed, polychromatic optical beam is received from a corresponding optical source and the plurality of narrowband optical beams are transmitted to a corresponding plurality of optical receivers, the improvement comprises employing a patterned optical input component corresponding to the multiplexed, polychromatic optical beam and the optical source for introducing a first patterned phase delay into the multiplexed, polychromatic optical beam, wherein the patterned optical input component has an effective focal length such that the optical source is disposed substantially inside the effective focal length of the patterned optical input component. The improvement also comprises employing a plurality of patterned optical output components corresponding to the plurality of narrowband optical beams and the plurality of optical receivers for introducing a second patterned phase delay into the plurality of narrowband optical beams, wherein each of the plurality of patterned optical output components has an effective focal length such that each of the plurality of optical receivers is disposed substantially inside the effective focal length of a corresponding one of the plurality of patterned optical output components. The first patterned phase delay and the second patterned phase delay are added so as to reshape the passband of the improved wavelength division demultiplexing device.

In accordance with other aspects of the present invention, the effective focal length of each of the plurality of patterned optical output components may be the same. Also, the effective focal length of the patterned optical input component may be the same as the effective focal length of each of the plurality of patterned optical output components. Alternatively, the effective focal length of each of the plurality of patterned optical output components may differ. Also, the effective focal length of the patterned optical input component may differ from the effective focal length of each of the plurality of patterned optical output components. In any event, the effective focal length of each of the plurality of patterned optical output components is beneficially derived from a quadratic phase term that is inherent in each of the plurality of patterned optical output components. Similarly, the effective focal length of the patterned optical input component is beneficially derived from a quadratic phase term that is inherent in the patterned optical input component.

In accordance with further aspects of the present invention, at least some of the plurality of patterned optical output components and the patterned optical input component are beneficially formed on a common substrate.

In accordance with still further aspects of the present invention, the spacing between each of the plurality of optical receivers, as well as the spacing between each of the corresponding plurality of patterned optical output components, increases as the difference between the wavelengths associated with each of the plurality of narrowband optical beams being transmitted to corresponding ones of the plurality of optical receivers increases.

In accordance with still further aspects of the present invention, each of the plurality of optical receivers may be, for example, an optical output fiber or a photodiode. If each of the plurality of optical receivers is an optical output fiber, wherein each of the plurality of narrowband optical beams is transmitted to a corresponding one of the plurality of optical output fibers, each of the plurality of optical output fibers is beneficially disposed from a corresponding one of the plurality of patterned optical output components at a distance defined by:

$$x = \frac{f}{2} + \frac{1}{4} \cdot \sqrt{4 \cdot f^2 - \frac{\pi^2 \cdot do^4}{\lambda^2}}$$

wherein f is the effective focal length of the corresponding one of the plurality of patterned optical output components, $d_o$ is a Gaussian mode field diameter of the optical output fiber, and $\lambda$ is the wavelength associated with the narrowband optical beam being transmitted to the optical output fiber. Accordingly, the distance between each of the plurality of optical output fibers and each corresponding one of the plurality of patterned optical output components may vary with wavelength. Alternatively, the effective focal length of each of the plurality of patterned optical output components may differ so that the distance between each of the plurality of optical output fibers and each corresponding one of the plurality of patterned optical output components does not vary with wavelength.

In accordance with still further aspects of the present invention, the optical source is beneficially an optical input fiber, wherein the multiplexed, polychromatic optical beam is received from the optical input fiber. The optical input fiber is beneficially disposed from the corresponding patterned optical input component at a distance defined by:

$$x = \frac{f}{2} + \frac{1}{4} \cdot \sqrt{4 \cdot f^2 - \frac{\pi^2 \cdot do^4}{\lambda^2}}$$

wherein f is the effective focal length of the corresponding patterned optical input component, $d_o$ is a Gaussain mode field diameter of the optical input fiber, the $\lambda$ is the average wavelength associated with the multiplexed, polychromatic optical beam being received from the optical input fiber.

In accordance with other aspects of the present invention, the patterned optical input component beneficially comprises a patterned phase mask for introducing the first patterned phase delay into the multiplexed, polychromatic optical beam. The patterned phase mask is preferably formed on/in a collimating microlens. Alternatively, the patterned optical output component also beneficially comprises a collimating microlens for collimating the multiplexed, polychromatic optical beam. In either case, the collimating microlens contributes to a widening of the passband of the improved wavelength division demultiplexing device.

In accordance with further aspects of the present invention, the patterned phase mask beneficially has a periodic phase profile. A benefit of this aspect is that the passband of the improved wavelength division demultiplexing device is a gaussian-shaped passband having a peak, and the periodic phase profile of the patterned phase mask contributes to a flattening of the peak of the gaussian-shaped passband of the improved wavelength division demultiplexing device. Another benefit to this aspect is that the passband of the improved wavelength division demultiplxing device is a guassian-shaped passband having sideband slopes, and the periodic phase profile of the patterned phase mask contributes to a steepening of the sideband slopes of the gaussian-shaped passband of the improved wavelength division demultiplexing device.

In accordance with still further aspects of the present invention, the patterned phase mask beneficially has a non-periodic phase profile. A benefit to this aspect is that the passband of the improved wavelength division demultiplexing device is a gaussian-shaped passband having a peak, and the non-periodic phase profile of the patterned phase mask contributes to a flattening of the peak of the gaussian-shaped passband of the improved wavelength division demultiplexing device. Another benefit to this aspect is that the passband of the improved wavelength division demultiplexing device is a guassian-shaped passband having sideband slopes, and the non-periodic phase profile of the patterned phase mask contributes to a steepening of the sideband slopes of the gaussian-shaped passband of the improved wavelength division demultiplexing device.

In accordance with other aspects of the present invention, the plurality of patterned optical output components beneficially comprises a plurality of patterned phase masks for introducing the second patterned phase delay into the plurality of narrowband optical beams. Each of the plurality of patterned phase masks is preferably formed on/in a corresponding focusing microlens. Alternatively, the plurality of patterned optical output components also beneficially comprises a plurality of focusing microlenses for focusing the plurality of narrowband optical beams. In either case, each corresponding focusing microlens or each of the plurality of focusing microlenses contributes to a widening of the passband of the improved wavelength division demultiplexing device.

In accordance with further aspects of the present invention, each of the plurality of patterned phase masks beneficially has a periodic phase profile. A benefit to this aspect is that the passband of the improved wavelength division demultiplexing device is a guassian-shaped passband having a peak, and the periodic phase profile of each patterned phase mask contributes to a flattening of the peak of the gaussian-shaped passband of the improved wavelength division demultiplexing device. Another benefit to this aspect is that the passband of the improved wavelength division demultiplexing device is a gaussian-shaped passband having sideband slopes, and the periodic phase profile of each patterned phase mask contributes to a steepening of the sideband slopes of the gaussian-shaped passband of the improved wavelength division demultiplexing device.

In accordance, with still further aspects of the present invention, each of the plurality of patterned phase masks beneficially has a non-periodic phase profile. A benefit to this aspect is that the passband of the improved wavelength division demultiplexing device is a gaussian-shaped passband having a peak, and the non-periodic phase profile of each patterned phase mask contributes to a flattening of the peak of the gaussian-shaped passband of the improved wavelength division demultiplexing device. Another benefit to this aspect is that the passband of the improved wavelength division demultiplexing device is a guassian-shaped passband having sideband slopes, and the non-periodic phase profile of each patterned phase mask contributes to a steepening of the sideband slopes of the gaussian-shaped passband of the improved wavelength division demultiplexing device.

The present invention will now be described in more detail with reference to exemplary embodiments thereof as shown in the appended drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1a is a side view of a preferred embodiment of a wavelength division multiplexing device employing patterned optical components in accordance with the present invention.

FIG. 1b is a top view of the wavelength division multiplexing device shown in FIG. 1a.

FIG. 3a is a side view of a preferred embodiment of a wavelength division demultiplexing device employing patterned optical components in accordance with the present invention.

FIG. 3b is a top view of the wavelength division demultiplexing device shown in FIG. 3a.

FIG. 4a is side view of a first embodiment of one of the plurality of patterned optical input components shown in FIG. 1.

FIG. 4b is a side view of a first embodiment of the patterned optical output component shown in FIGS. 1a and 1b.

DETAILED DESCRIPTION OF EXEMPLARY EMBODIMENTS(S)

Figure 1C:
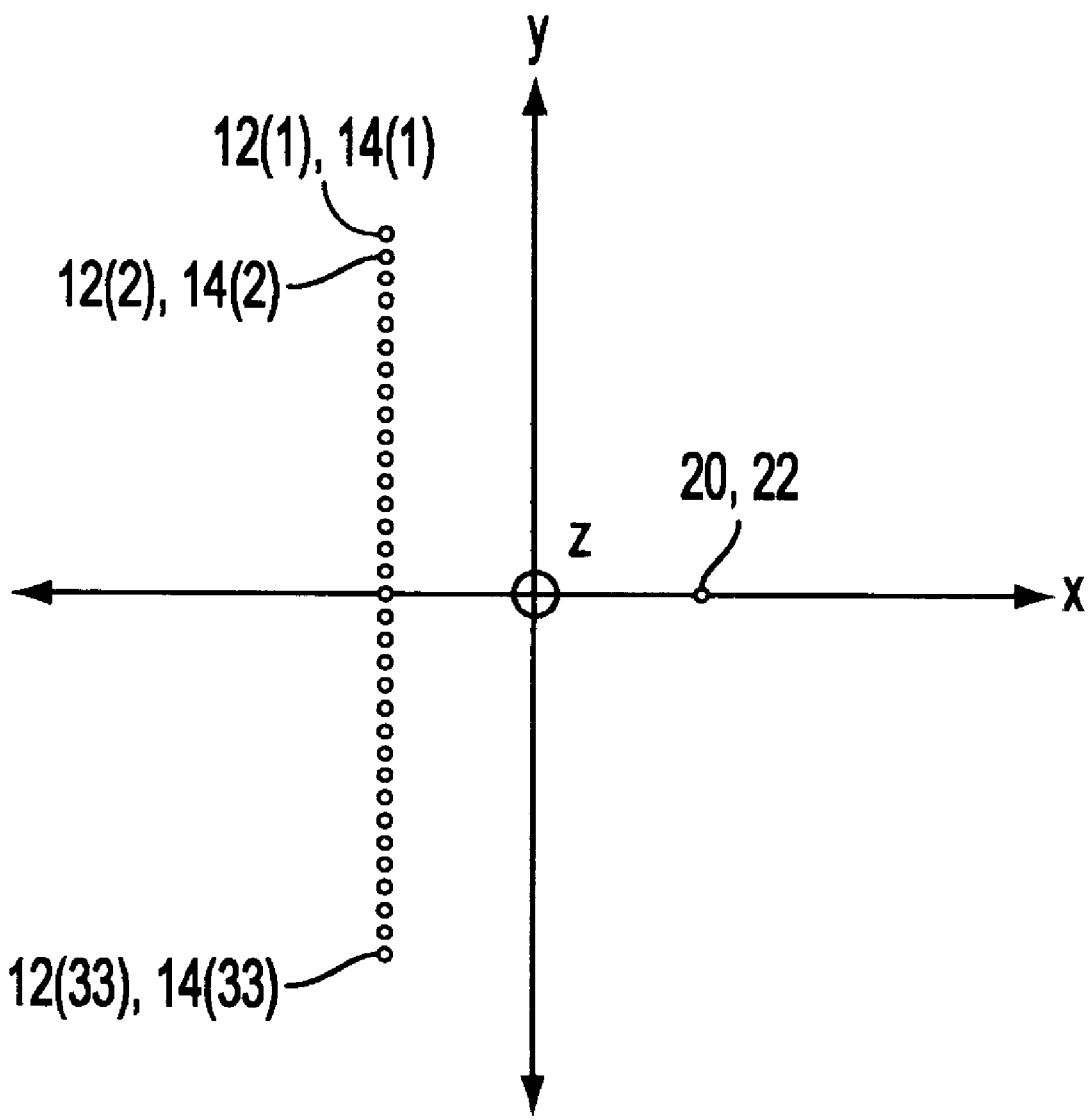
FIG. 1c is an end view of the optical fibers and the corresponding patterned optical components, along section A—A of FIGS. 1a and 1b.

Referring to FIGS. 1a and 1b, there are shown a side view and a top view, respectively, of a preferred embodiment of a wavelength division multiplexing device 10 employing patterned optical components in accordance with the present invention. The multiplexing device 10 comprises a plurality of optical input fibers 12, a corresponding plurality of patterned optical input components 14, a collimating/focusing lens 16, a reflective diffraction grating 18, a patterned optical output component 20, and a corresponding optical output fiber 22. All of the above-identified components of the multiplexing device 10 are disposed along an optical axis Z—Z of the multiplexing device 10, as will be described in more detail below.

At this point it should be noted that the optical input fibers 12 and the optical output fibers 22, as well as any other optical fibers described herein, are single mode optical fibers. Of course, however, this does not limit the present invention to use with only single mode optical fibers. For example, the present invention can also be used with multimode optical fibers.

The plurality of optical input fibers 12, as well as the corresponding plurality of patterned optical input components 14, are arranged into one-dimensional input arrays (e.g., 1×33 arrays). The patterned optical output component 20, as well as the corresponding optical output fiber 22, are also arranged into one-dimensional output arrays (i.e., 1×1 arrays). For ease of alignment, each of the plurality of patterned optical input components 14 may be secured to the end of a corresponding one of the plurality of optical input fibers 12, but the present invention is not limited in this regard. For example, each of the plurality of patterned optical input components 14 may be aligned with, but separated from, the end of a corresponding one of the plurality of optical input fibers 12. Similarly, for ease of alignment, the patterned optical output component 20 may be secured to the end of the corresponding optical output fiber 22, but the present invention is not limited in this regard. For example, the patterned optical output component 20 may be aligned with, but separated from, the end of the corresponding optical output fiber 22. For purposes of ease of optical fiber handling and precision placement, both the plurality of optical input fibers 12 and the optical output fiber 22 may be secured within, for example, silicon V-groove assemblies.

Referring to FIG. 1c, there is shown an end view of the plurality of optical input fibers 12, as well as the corresponding plurality of patterned optical input components 14, along section A—A of FIGS. 1a and 1b. Each of the plurality of optical input fibers 12 is aligned with a corresponding one of the plurality of patterned optical input components 14. Both the plurality of optical input fibers 12 and the corresponding plurality of patterned optical input components 14 are arranged as 1×33 arrays.

Also referring to FIG. 1c, there is shown an end view of the patterned optical output component 20, as well as the corresponding optical output fiber 22, along section A—A of FIGS. 1a and 1b. The patterned optical output component 20 is aligned with the corresponding optical output fiber 22. Both the patterned optical output component 20 and the corresponding optical output fiber 22 are arranged as 1×1 arrays.

Returning to FIGS. 1a and 1b, each of the plurality of optical input fibers 12 transmits a single, narrowband optical input beam 24, while the optical output fiber 22 receives a single, multiplexed, polychromatic optical output beam 26. Each of the narrowband optical input beams 24 being transmitted from the plurality of optical input fibers 12 is carrying a single channel of data at a unique wavelength, which is preferably, but not required to be, within the infrared (IR) region of the electromagnetic spectrum. The single channel of data that is being carried by each narrowband optical input beam 24 is superimposed on each corresponding unique wavelength by means (e.g., laser diodes connected to the plurality of optical input fibers 12), which are not shown here and which do not form a part of this invention, but are well known in the art. The unique wavelengths of the narrowband optical input beams 24 are appropriately preselected such that the data channels generally do not interfere with each other (i.e., there is sufficient channel spacing), and the optical transmission losses through both the optical input fibers 12 and the optical output fiber 22 are low, as is also well known in the art.

The multiplexed, polychromatic optical output beam 26 being received by the optical output fiber 22 is carrying a plurality of channels of data at the unique wavelengths of corresponding ones of the plurality of narrowband optical input beams 24. That is, the multiplexed, polychromatic optical output beam 26 is carrying a plurality of channels of data (e.g., 33 channels of data) at the unique wavelengths of the narrowband optical input beams 24 that are transmitted from the optical input fibers 12. The plurality of narrowband optical input beams 24 are combined into the multiplexed, polychromatic optical output beam 26 through the combined operation of the collimating/focusing lens 16 and the reflective diffraction grating 18, as will be described in more detail below.

At this point it should be noted that the spacing between each of the plurality of optical input fibers 12, as well as the spacing between each of the corresponding plurality of patterned optical input components 14, is not equal due to the well known reciprocal relationship between the frequency and wavelength (i.e., $\lambda=c/f$), and due to a nonlinear relationship between the diffraction angle of the reflective diffraction grating 18 and the unique channel wavelengths associated with the narrowband optical input beams 24 being transmitted from the plurality of optical input fibers 12, which will be described in more detail below. That is, the difference between the unique channel wavelengths increases as corresponding equally spaced channel frequencies decrease in accordance with the optical telecommunications frequency standard of the International Telecommunication Union (ITU) due to the well known reciprocal relationship between frequency and wavelength. Thus, as equally spaced channel frequencies decrease in accordance with the optical telecommunication frequency standard of the ITU, the difference between corresponding unique channel wavelengths increases, which affects the diffraction angle of the reflective diffraction grating 18 through the nonlinear relationship between the diffraction angle of the reflective diffraction gating 18 and the unique channel wavelengths, which in turn affects optical coupling of the multiplexed, polychromatic optical output beam 26 with the optical output fiber 22. To compensate for these affects, the spacing between each of the plurality of optical input fibers 12, as well as the spacing between each of the corresponding plurality of patterned optical input components 14, increases as the difference between the unique channel wavelengths increases.

At this point it should also be noted that the plurality of optical input fibers 12 (as well as the corresponding plurality of patterned optical input components 14) and the optical output fiber 22(as well as the corresponding patterned optical output component 20) are disposed offset form, but symmetrically about, the optical axis Z—Z of the multiplexing device 10 so as to insure that the multiplexed, polychromatic optical output beam 26 is directed to the patterned optical output component 20 and the corresponding optical output fiber 22, and not to anywhere else. This offset spacing of the plurality of optical input fibers 12 (as well as the corresponding plurality of pattered optical input components 14) and the optical output fiber 22 (as well as the corresponding patterned optical output component 20) is determined based upon the focusing power of the collimating/focusing lens 16, as well as the characteristics of the reflective diffraction grating 18 and the wavelengths of each of the narrowband optical input beams 24.

Each of the plurality of narrowband optical input beams 24 is transmitted from its corresponding optical input fiber 12 through a corresponding one of the plurality of patterned optical input components 14 and into the air space between the plurality of patterned optical input components 14 and the collimating/focusing lens 16. Within this air space, the plurality of narrowband optical input beams 24 expand in diameter unitl they become incident upon the collimating/focusing lens 16. The collimating/focusing lens 16 collimates each of the plurality of narrowband optical input beams 24, and then transmits each collimated, narrowband optical input beam 24' to the reflective diffraction grating 18.

At this point it should be noted that the optical axis of the collimating/focusing lens 16 coincides with the optical axis Z—Z of the multiplexing device 10 so as to insure that the multiplexed, polychromatic optical output beam 26 is directed to the patterned optical output component 20 and the corresponding optical output fiber 22, and not to anywhere else, as will be described in more detail below.

The reflective diffraction grating 18 operates to angularly disperse the plurality of collimated, narrowband optical input beams 24' by an amount that is dependent upon the wavelength of each of the plurality of collimated, narrowband optical input beams 24'. Also, the reflective diffraction grating 18 is oriented at a special angle (i.e., the Littrow diffraction angle, $\alpha_i$) relative to the optical axis Z—Z of the multiplexing device 10 in order to obtain the Littrow diffraction condition for an optical beam having a wavelength that lies within or near the wavelength range of the plurality of collimated, narrowband optical input beams 24'. The Littrow diffraction condition requires that an optical beam be incident on and reflected back from a reflective diffraction grating at the exact same angle. Therefore, it will be readily apparent to one skilled in the art that the reflective diffraction grating 18 is used to obtain near-Littrow diffraction for each of the plurality of collimated, narrowband optical input beams 24'.

The Littrow diffraction angel, $\alpha_i$, is determined by the well-known diffraction grating equation, $$m\lambda = 2d(\sin\alpha_i)$$

wherein m is the diffraction order, $\lambda$ is the wavelength, d is the diffraction grating groove spacing, and $\alpha_i$ is the common angle of incidence and reflection. It will be readily apparent to one skilled in the art that the Littrow diffraction angle, $\alpha_i$, depends upon numerous variables, which may be varied as necessary to optimize the performance of the multiplexing device 10. For example, variables affecting the Littrow diffraction angle, $\alpha_i$, include the desired grating diffraction order, the grating line pitch, and the wavelength range of the multiplexing device 10, among others.

At this point it should be noted that the reflective diffraction grating 18 can be formed from a variety of materials and by a variety of techniques. For example, the reflective diffraction grating 18 can be formed by a three-dimensional hologram in a polymer medium, or by replicating a mechanically ruled master with a polymer material. In both cases, the polymer is preferably overcoated with a thin, highly reflective metal layer such as, for example, gold or aluminum. Alternatively, the reflective diffraction grating 18 can be formed by chemically etching into a planar material such as, for example, glass or silicon, which is also preferably overcoated with a thin, highly reflective metal layer such as, for example, gold or aluminum.

As previously mentioned, the reflective diffraction grating 18 operates to angularly disperse the plurality of collimated, narrowband optical input beams 24'. Thus, the reflective diffraction grating 18 removes the angular separation of the plurality of collimated, narrowband optical input beams 24', and reflects a collimated, polychromatic optical output beam 26' back towards the collimating/focusing lens 16. The collimated, polychromatic optical output beam 26' contains each of the unique wavelengths of the plurality of collimated, narrowband optical input beams 24'. Thus, the collimated, polychromatic optical output beam 26' is a collimated, multiplexed, polychromatic optical output beam 26'. The collimating/focusing lens 16 focuses the collimated, multiplexed, polychromatic optical output beam 26'. The resulting multiplexed, polychromatic optical output beam 26 is transmitted from the collimating/focusing lens 16 through the patterned optical output component 20 and into the corresponding optical output fiber 22 for transmission therethrough.

Figure 2A:
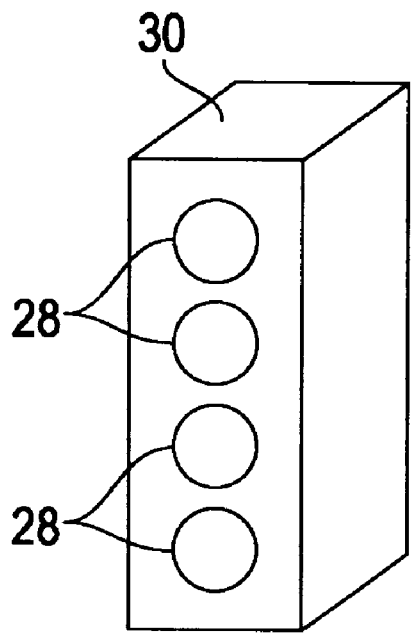
FIG. 2a is a perspective view of a coupling device containing a plurality of laser diodes for replacing the plurality of optical input fibers in the multiplexing device shown in FIGS. 1a and 1b.

At this point it should be noted that the plurality of optical input fibers 12 could be replaced in the multiplexing device 10 by a corresponding plurality of laser diodes 28 secured within a coupling device 30, such as shown in FIG. 2a (although FIG. 2a shows only a single 1×4 array). The coupling device 30 serves to precisely group the plurality of laser diodes 28 into a one-dimensional input array. The plurality of laser diodes 28 are used in place of the plurality of optical input fibers 12 to transmit the plurality of narrowband optical input beams 24 to the multiplexing device 10. The array of laser diodes 28, as well as the plurality of optical input fibers 12, may operate alone, or may be used with appropriate focusing lenses (not shown) to provide the best coupling and the lowest amount of signal loss and channel crosstalk.

At this point it should be noted that the multiplexing device 10, as well as all of the multiplexing devices described herein, may be operated in a converse configuration as a demultiplexing device 40, such as shown in FIGS. 3a and 3b. The demultiplexing device 40 is physically identical to the multiplexing device 10, and is therefore numerically identified as such. However, the demultiplexing device 40 is functionally opposite to the multiplexing device 10. That is, a multiplexed, polychromatic optical input beam 42 is transmitted from the optical fiber 22, and a plurality of narrowband optical output beams 44 are transmitted to the plurality of optical fibers 12, wherein each one of the plurality of narrowband optical output beams 44 is transmitted to a corresponding one of the plurality of optical fibers 12. The multiplexed, polychromatic optical input beam 42 is simultaneously carrying a plurality of channels of data, each at a unique wavelength which is preferably, but not required to be, within the infrared (IR) region of the electromagnetic spectrum. The plurality of narrowband optical output beams 44 are each carrying a single channel of data at a corresponding one of the unique wavelengths of the multiplexed, polychromatic optical input beam 42. The multiplexed, polychromatic optical input beam 42 is separated into the plurality of narrowband optical output beams 44 through the combined operation of the collimating/focusing lens 16 and the reflective diffraction grating 18. Thus, the collimating/focusing lens 16 and the reflective diffraction grating 18 operate to perform a demultiplexing function.

Figure 2B:
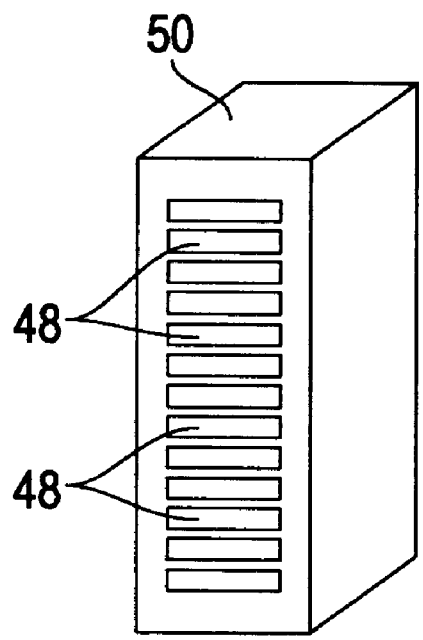
FIG. 2b is a perspective view of a coupling device containing a plurality of photodetectors for replacing the plurality of optical fibers in the demultiplexing device shown in FIGS. 3a and 3b.

At this point it should be noted that the plurality of optical fibers 12 could be replaced in the demultiplexing device 40 by a corresponding plurality of photodetectors 48 secured within a coupling device 50, such as shown in FIG. 2b (although FIG. 2b shows only a single 1×13 array). The coupling device 50 serves to precisely group the plurality of photodetectors 48 into a one-dimensional output array. The plurality of photodetectors 48 are used in place of the plurality of optical fibers 12 to receive the plurality of narrowband optical output beams 44 from the demultiplexing device 40. The array of photodetectors 48, as well as the plurality of optical fibers 12, may operate alone, or may be used with appropriate focusing lenses (not shown) to provide the best coupling and the lowest amount of signal loss and channel crosstalk.

At this point it is appropriate to describe in more detail the plurality of patterned optical input components 14 and the patterned optical output component 20, and the function thereof. Referring to FIG. 4a, there is shown a first embodiment of one of the plurality of patterned optical input components 14 comprising a collimating microlens 60 and a first patterned phase mask 62. In the case of the multiplexing device 10, the narrowband optical input beam 24 is transmitted from the core 13 of a corresponding optical input fiber 12 to the collimating microlens 60. During this period, the narrowband optical input beam 24 has a generally spherical wavefront 64 and is expanding due to gaussian beam diffraction.

The collimating microlens 60 collimates the narrowband optical input beam 24 and then transmits the narrowband optical input beam 24 to the first patterned phase mask 62. During this period, the narrowband optical input beam 24 is still slightly expanding due to gaussian beam diffraction, but the narrowband optical input beam 24 has a generally planar wavefront 66 due to the effect of the collimating microlens 60. Also, the collimating microlens 60 causes a widening of the gaussian-shaped passband profile of the multiplexing device 10, as described in more detail below.

The first patterned phase mask 62 introduces a first patterned phase delay into the narrowband optical input beam 24 and then transmits the narrowband optical input beam 24 to the collimating/focusing lens 16 (not shown). During this period, the narrowband optical input beam 24 is still slightly expanding due to gaussian beam diffraction, but the narrowband optical input beam 24 also has a first patterned wavefront 68 due to the first patterned phase delay that is introduced into the narrowband optical input beam 24 by the first patterned phase mask 62. In accordance with the present invention, the first patterned wavefront 68, and hence the first patterned phase delay, contribute to a flattening of the peak of the gaussian-shaped passband profile of the multiplexing device 10, as described in more detail below.

At this point it should be noted that the order of the collimating microlens 60 and the first patterned phase mask 62 may be reversed without adversely affecting the resulting narrowband optical input beam 24 that is transmitted to the collimating/focusing lens 16 (not shown). That is, the narrowband optical input beam 24 may first be transmitted from the core 13 of the corresponding optical input fiber 12 to the first patterned phase mask 62 so that a first patterned phase delay may be introduced into the narrowband optical input beam 24. The narrowband optical input beam 24 may then be transmitted from the first patterned phase mask 62 to the collimating microlens 60 so that the narrowband optical input beam 24 may be collimated. Similar to above, the resulting narrowband optical input beam 24 that is transmitted to the collimating/focusing lens 16 (not shown) will be slightly expanding due to gaussian beam diffraction, but will also have a first patterned wavefront 68 due to the first patterned phase delay that is introduced into the narrowband optical input beam 24 by the first patterned phase mask 62.

Referring to FIG. 4*b*, there is shown a first embodiment of the patterned optical output component 20 comprising a focusing microlens 70 and a second patterned phase mask 72. Again in the case of the multiplexing device 10, the multiplexed, polychromatic optical output beam 26 is transmitted from the collimating/focusing lens 16 (not shown) to the second patterned phase mask 72. During this period, the multiplexed, polychromatic optical output beam 26 is being focused by the collimating/focusing lens 16 (not shown). Also during this period, the multiplexed, polychromatic optical output beam 26 has a first patterned wavefront 68 due to the first patterned phase delay that is introduced into the narrowband optical input beam 24 (as well as all other narrowband optical input beams 24 that are combined into the multiplexed, polychromatic optical output beam 26 through the combined operation of the collimating/focusing lens 16 and the reflective diffraction grating 18) by the first patterned phase mask 62.

The second patterned phase mask 72 introduces a second patterned phase delay into the multiplexed, polychromatic optical output beam 26 and then transmits the multiplexed, polychromatic optical output beam 26 to the focusing microlens 70. During this period, the multiplexed, polychromatic optical output beam 26 is still being focused as a result of the collimating/focusing lens 16 (not shown). Also during this period, the second patterned phase delay that is introduced into the multiplexed, polychromatic optical output beam 26 by the second patterned phase mask 72 is added to the first patterned phase delay that is introduced into the narrowband optical input beam 24 (as well as all other narrowband optical input beams 24 that are combined into the multiplexed, polychromatic optical output beam 26 through the combined operation of the collimating/focusing lens 16 and the reflective diffraction grating 18) by the first patterned phase mask 62.

The addition of the second patterned phase delay to the first patterned phase delay is wavelength dependent. That is, the second patterned phase mask 72 and the first patterned phase mask 62 are designed such that the addition of the second patterned phase delay to the first patterned phase delay results in either constructive or destructive interference in the multiplexed, polychromatic optical output beam 16 depending upon the actual wavelength of each communication channel signal in relation to the expected unique center wavelength of that communication channel. Thus, during this period, the wavefront of the multiplexed, polychromatic optical output beam 26 may vary from a second patterned wavefront 78 as a result of the second patterned phase delay and the first patterned phase delay constructively adding to each other when they are completely in phase, to a generally planar wavefront 76 as a result of the second patterned phase delay and the first patterned phase daily destructively canceling each other when they are 180 degrees out of phase. The constructive adding, or interference, results in more diffracted energy (and thus a greater reduction in the amount of total energy at selected locations in the passband profile), while the destructive canceling, or interference, results in less diffracted energy (and thus a lesser reduction in the amount of total energy at selected locations in the passband profile). The actual wavelength of each communication channel signal may drift off the expected unique center wavelength of that communication channel for a number of reasons, including, for example, temperature and laser diode modulation. In this particular embodiment, the second patterned phase mask 72 and the first patterned phase mask 62 are designed so as to result in a flattening of the peak of the gaussian-shaped passband profile of the 10 multiplexing device 10, as describe in more detail below.

The focusing microlens 70 focuses the multiplexed, polychromatic optical output beam 26 and then transmits the multiplexed, polychromatic optical output beam 26 toward the optical output fiber 22. During this period, the multiplexed, polychromatic optical output beam 26 varies between a generally spherical wavefront 77 and a converging patterned wavefront 79 due to the effect of the focusing microlens 70 on the multiplexed, polychromatic optical output beam 26. Also during this period, certain portions of the multiplexed, polychromatic optical output beam 26 are slightly more focused on the core 23 of the optical output fiber 22 as a result of the focusing microlens 70 and due to the above-described destructive interference (or lack of the above-described constructive interference) on certain portions of the multiplexed, polychromatic optical output beam 26, while certain other portions of the multiplexed, polychromatic optical output beam 26 are scattered due to the above-described constructive interference. Thus, those portions of the multiplexed, polychromatic optical output beam 26 that are not scattered due to the above-described constructive interference are more likely to be coupled into the core 23 of the optical output fiber 22 for transmission therethrough.

At this point it should be noted that the focusing microlens 70 causes a further widening of the gaussian-shaped passband profile of the multiplexing device 10. That is, the combination of the effect of the collimating microlens 60 on the narrowband optical input beam 24 (as well as all other narrowband optical input beams 24 that are combined into the multiplexed, polychromatic optical output beam 26 through the combined operation of the collimating/focusing lens 16 and the reflective diffraction grating 18), and the effect of the focusing microlens 70 on the multiplexed, polychromatic optical output beam 26 causes an overall widening of the gaussian-shaped passband profile of the multiplexing device 10.

At this point is should be noted that the order of the focusing microlens 70 and the second patterned phase mask 72 may be reversed without adversely affecting the resulting multiplexed, polychromatic optical output beam 26 that is transmitted toward the optical output fiber 22. That is the multiplexed, polychromatic optical output beam 26 may first be transmitted from the collimating/focusing lens 16 (not shown) to the focusing microlens 70 so that the multiplexed, polychromatic optical output beam 26 may be focused. The multiplexed, polychromatic optical output beam 26 may then be transmitted from the focusing microlens 70 to the second patterned phase mask 72 so that a second patterned phase delay may be introduced into the multiplexed, polychromatic optical output beam 26. Similar to above, certain portions of the resulting multiplexed, polychromatic optical output beam 26 that is transmitted toward the optical output fiber 22 will be slightly more focused on the core 23 of the optical output fiber 22 as a result of the focusing microlens 70 and due to destructive interference (or the lack of constructive interference) on certain portions of the multiplexed, polychromatic optical output beam 26, while certain other portions of the resulting multiplexed, polychromatic optical output beam 26 will be scattered due to constructive interference, such that those portions of the resulting multiplexed, polychromatic optical output beam 26 that are not scattered due to constructive interference are more likely to be coupled into the core 23 of the optical output fiber 22 for transmission therethrough.

Figure 5B:
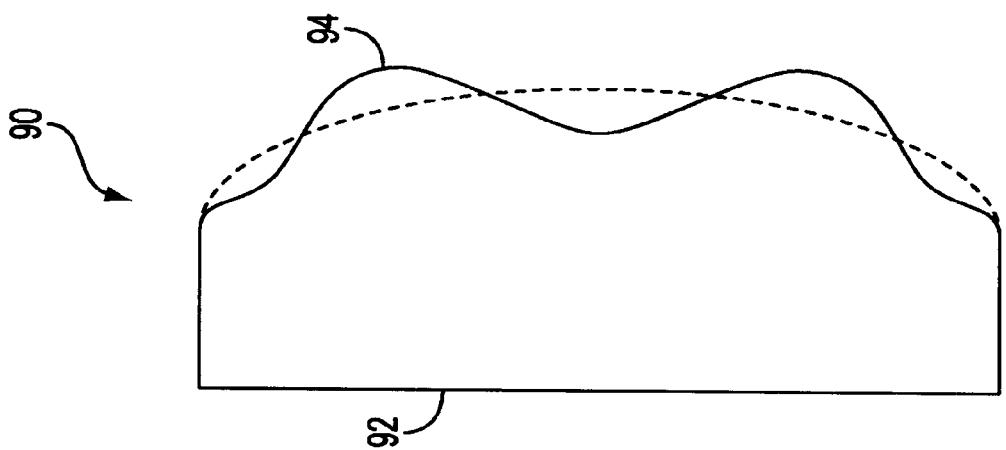
FIG. 5b is a side view of a plano-convex collimating/focusing microlens having a pure planar surface on one side and a patterned phase mask convex surface on the opposite side in accordance with the present invention.
Figure 5A:
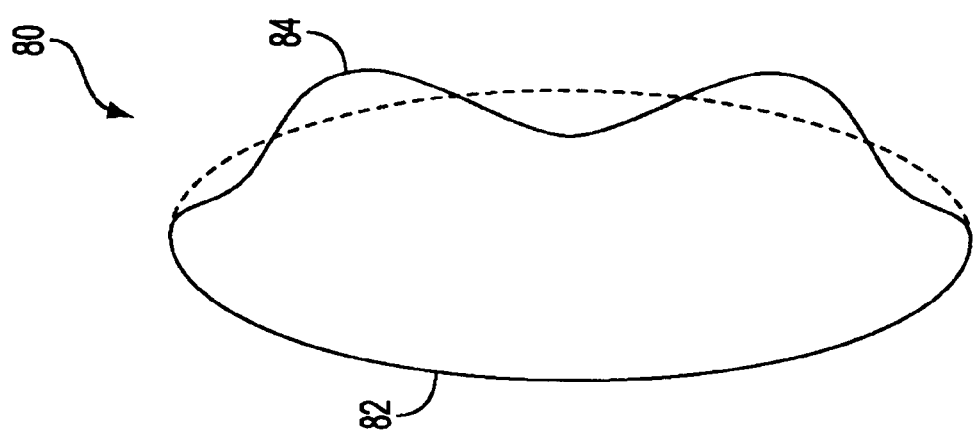
FIG. 5a is a side view of a bi-convex collimating/focusing microlens having a pure convex surface on one side and a patterned phase mask convex surface on the opposite side in accordance with the present invention.

At this point it should be noted that the first patterned phase mask 62 may be integrated into the collimating microlens 60, and the second patterned phase mask 72 may be integrated into the focusing microlens 70. For example, referring to FIG. 5a, there is shown a bi-convex collimating/focusing microlens 80 having a pure convex surface 84 on the opposite side. Alternatively, referring to FIG. 5b, there is shown a plano-convex collimating/focusing microlens 90 having a pure planar surface 92 on one side and a patterned phase mask convex surface 94 on the opposite side. Of course, other types of microlenses may be used in accordance with the present invention. For example, microlenses having concave or diffractive optic imaging surfaces may be used in accordance with the present invention, and patterned phase masks may be formed on, or otherwise used with, any of these imaging surfaces.

At this point it should be noted that if a patterned phase mask is integrated into a collimating/focusing microlens, then a particular optimal imaging distance is preferably established between the integrated patterned optical input/output component and the end of a corresponding optical input/output fiber. For example, referring to FIG. 6, there is shown a side view of a plurality of optical input fibers 12 and a corresponding plurality of integrated patterned optical input components 110 for illustrating an optimal imaging distance therebetween in accordance with the present invention. The plurality of optical input fibers 12 are shown secured within a silicon V-groove assembly 112. Meanwhile, the plurality of integrated patterned optical input components 110 are shown formed in a common glass substrate 112. That is, each of the plurality of integrated patterned optical input components 110 is formed in, preferably by etching, the common glass substrate 114 such that each of the plurality of integrated patterned optical input components 110 comprises a plano-convex collimating microlens having a pure planar surface on one side 116 and a patterned phase mask convex surface on the opposite side 118.

Figure 6:
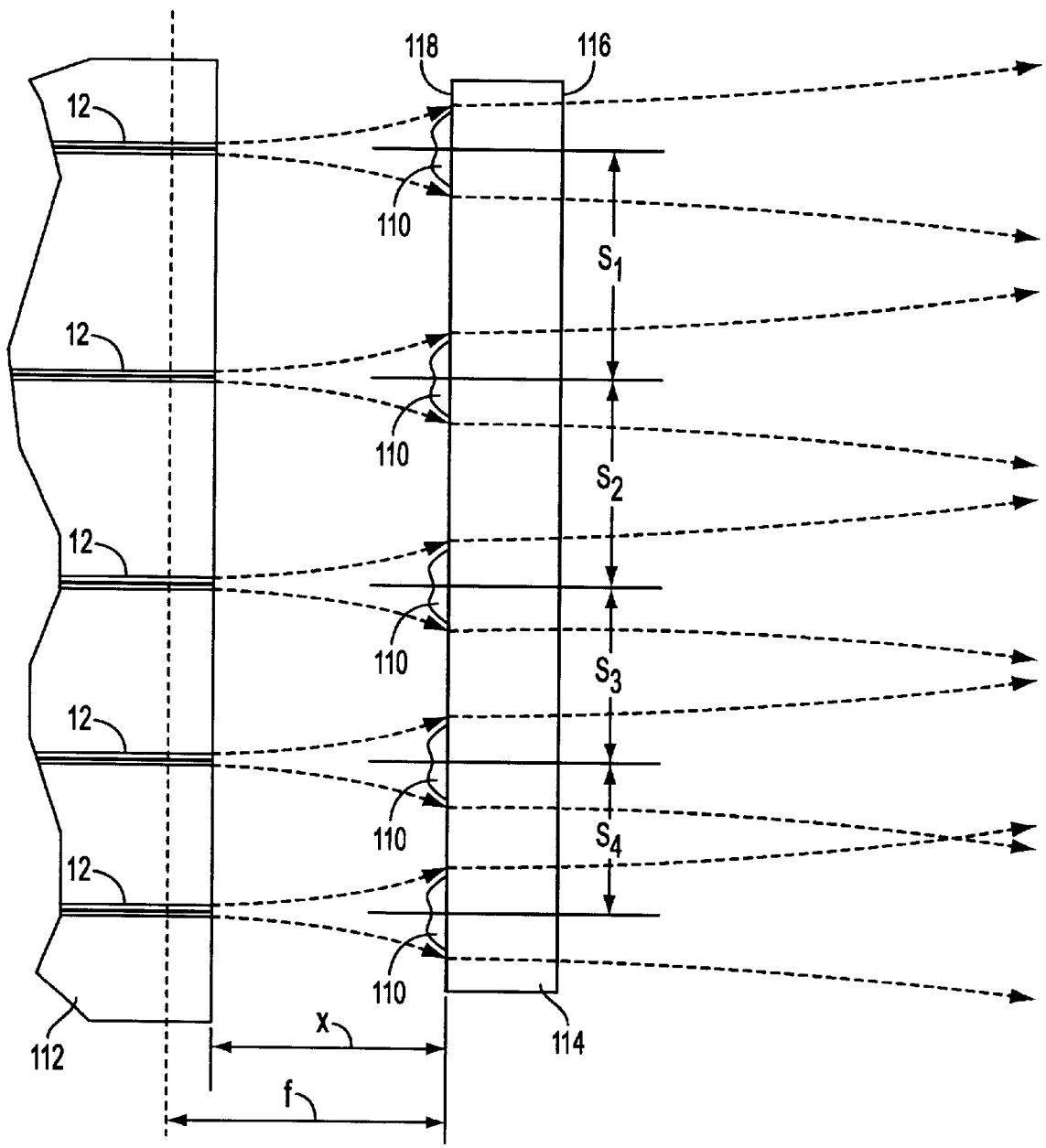
FIG. 6 is a side view of a plurality of optical input fibers and a corresponding plurality of integrated patterned optical input components for illustrating an optimal imaging distance therebetween in accordance with the present invention.

As shown in FIG. 6, the focal length, f, of the plano-convex collimating microlens in each of the plurality of integrated patterned optical input components 110 extends well into each corresponding optical input fiber 12. This focal length, f, is derived from a quadratic phase term that is inherent in each of the plurality of integrated patterned optical input components 110. In contrast, the optimal imaging distance, x, between each integrated patterned optical input component and the end of each corresponding optical input fiber 12 is defined by the following equation:

$$x = \frac{f}{2} + \frac{1}{4} \cdot \sqrt{4 \cdot f^2 - \frac{\pi^2 \cdot d_o^4}{\lambda^2}}$$

wherein f is the focal length the plano-convex collimating microlens in each of the plurality of integrated patterned optical input components 110, $d_o$ is the Gaussian mode field diameter at the end of the optical input fiber 12, and $\lambda$ is the wavelength associated with the narrowband optical input beam 24 being transmitted through the optical input fiber 12 and the integrated patterned optical input component 110. Importantly, due to the presence of the wavelength term, $\lambda$, in the above equation, it is clear that the optimal imaging distance, x, between each integrated patterned optical input component 110 and the end of each corresponding optical input fiber 12 varies slightly with wavelength. However, to compensate for this slight variation in the optimal imaging distance, x, between each integrated patterned optical input component 110 and the end of each corresponding optical input fiber 12, the focal length, f, of the plano-convex collimating microlens in each of the plurality of integrated patterned optical input components 110 may be varied slightly when forming each of the plurality of integrated patterned optical input components 110.

At this point it should be noted that a similar optimal imaging distance, x, is also preferably established between an integrated patterned optical output component and the end of a corresponding optical output fiber, wherein the wavelength term, $\lambda$, in the above equation represents the average wavelength associated with the multiplexed, polychromatic optical output beam 26.

At this point is should be noted that, as shown in FIG. 6, the spacing, s, between adjacent optical input fibers 12, as well as between corresponding adjacent integrated patterned optical input components 110, increases as the difference between the unique channel wavelengths associated with the narrowband optical input beams 24 being transmitted through the plurality of optical input fibers 12 and the plurality of integrated patterned optical input components 110 increases. As previously described, this increase in the spacing, s, between adjacent optical input fibers 12, as well as between adjacent integrated patterned optical input components 110, compensates for diffraction angle and optical coupling affects due to the well known reciprocal relationship between the frequency and wavelength (i.e., $\lambda = c/f$), and due to a nonlinear relationship between the diffraction angle of the reflective diffraction grating 18 and the unique channel wavelengths associated with the narrowband optical input beams 24 being transmitted from the plurality of optical input fibers 12. As shown in FIG. 6, the spacing relationships are as follows: $s_1 > s_2 > s_3 > s_4$.

At this point it is appropriate to describe in more detail the manner in which the first patterned phase mask 62 and the second patterned phase mask 72 operate to achieve a flattening of the peak of the gaussian-shaped passband profile of the multiplexing device 10. First, it is preferred that the microlenses 60 and 70 (and/or the combined microlens/phase mask) be placed at the focus of the collimating/ focusing lens 16 so that the phase mask is imaged back onto its own plane. Hence, if the narrowband optical input beams 24 or the multiplexed, polychromatic optical output beam 26 are not truncated or aberrated by the optical system, the phase of the initial wavefront is preserved as Fresnel diffraction terms vanish.

Second, since the collimating/focusing lens 16 is preferably of telecentric design, the wavefront of the narrowband optical input beams 24 of the multiplexed, polychromatic optical output beam 26 returning from the optical system only translates across the receiving microlens aperture as the illumination wavelength varies over the passband range (i.e., there is not tilt). Hence, the overlap integral of the source and receiver amplitude distributions can be reduced to an integral over spatial dimensions, without needing an integration over angle.

Third, the mathematical operation of the input microlens aperture amplitude distribution translating over the receiving microlens aperture amplitude distribution is a cross-correlation. With no phase mask, the amplitude distribution is given by the gaussian mode field diameter multiplied by the truncation due to the microlens physical aperture. Thus, let $$G(x, y) \equiv \text{gaussian amplitude distribution} = e^{-[(\frac{x}{a})^2 + (\frac{y}{a})^2]}$$

wherein a is equal to 1/e (amplitude mode field radius), and let, $$R(x,y) \equiv \text{Rectangular Aperture Function} = \{1 : x, y \leq L, 0 \text{ otherwise}\}$$

wherein L is equal to 1/2 (aperture width).

The amplitude distribution at the microlens with no phase mask is, $$Ap_o(x,y) = G(x,y)R(x,y)$$

The amplitude distribution at the microlens with a phase mask is, $$Ap_m(x,y) = G(x,y)R(x,y)P(x) = Ap_o(x,y)P(x)$$

wherein $P(x)$ never is greater than 1 or less than $-1$. Hence, the amplitude and therefore coupled energy into the fiber is never greater than the non-phase masked case for the same gaussian profile and aperture.

Let the phase mask function be a coarse sinusoidal (or cosinusoidal) transmission grating in the x direction:

$$P(x) = e^{-i \cdot \phi \cdot \sin(2.5\pi \frac{x}{L})}$$

wherein $\phi$ is the amplitude of the phase profile (i.e., $0.1\pi$), and L is the half-width of the aperture.

The sinusoidal phase function can be expanded into a Jacobi series in order to determine the amplitude of each diffracted order from the coarse phase grating mask. The amplitude for the $n^{th}$ diffracted order is given by an $n^{th}$ order Bessel function coefficient. The energy coupled into the receiving fiber is given by the $0^{th}$ order:

$$e^{i\phi \sin(\theta)} = J_0(\phi) + 2J_2(\phi)\cos(2\theta) + 2J_4(\phi)\cos(4\theta) + \ldots + 2i[J_1(\phi)\sin(\theta) + J_3(\phi)\sin(3\theta) + \ldots]$$

wherein $J_n$ is a Bessel function of order n. For $\phi=0.1\pi$, $J_0=0.975$, $J_1=0.155$, $J_2=0.012$, $J_3=0.00064$, . . . .

The resultant amplitude distribution after the receiver phase mask, as the wavelength is varied over the passband, can be calculated by multiplying the source and receiver amplitude profiles together with a lateral shift of the source on the receiver corresponding to the location within the passband. A one-dimensional cross-correlation of $Ap^*(x,y)_{source}$ with $Ap(x,y)_{receiver}$ computes the fiber coupling amplitude overlap integral as a function of location in the passband (square result to get energy):

$$A(u) = \int_{-L}^{L} \int_{-L/2}^{L/2} Ap_S(x, y) Ap_R(x+u, y) dy dx = Ap_S^*(x, y) \otimes Ap_R(x, y)$$

Letting the source and receiver phase mask be equal, and retaining only the first order diffraction terms from the series expansion, the resultant amplitude of the source multiplied by the receiver, as the source is shifted by $\Delta s$ is:

$$A(x, y, \Delta x) = Ap_o(x, y) Ap_o(x + \Delta x, y) \cdot \left[ J_0^2(\phi) + \right.$$

$$2i \cdot J_1(\phi) J_0(\phi) \left[ \sin\left(2\pi\left(\frac{2.5}{L}\right)x\right) + \sin\left(2\pi\left(\frac{2.5}{L}\right)(x+\Delta x)\right) \right] +$$

$$\left. 2J_1^2(\phi) \left[ \cos\left(2\pi\left(\frac{2.5}{L}\right)(2x+\Delta x)\right) - \cos\left(2\pi\left(\frac{2.5}{L}\right)(-\Delta x)\right) \right] \right]$$

Integrating the above over x and y as a function of $\Delta x$, and squaring to give intensity, gives the passband for the sinusoidal phase mask.

Figure 7:
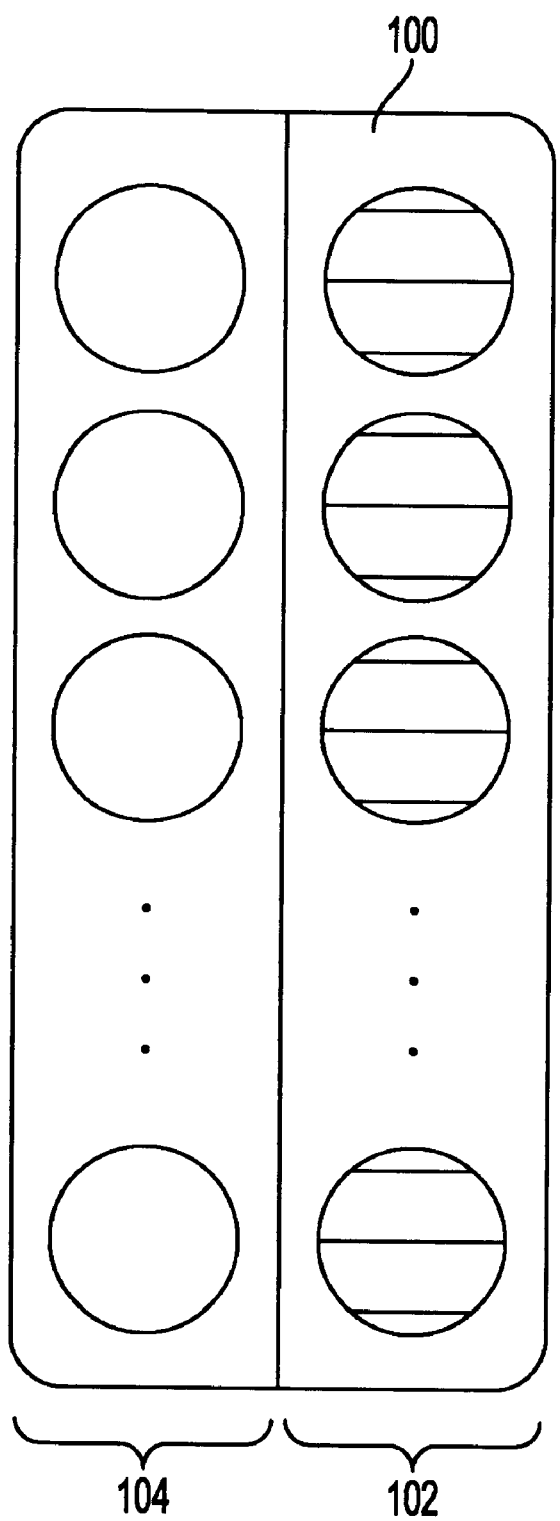
FIG. 7 is a front view of a substrate having an array of patterned and non-patterned micolenses formed therein in accordance with the present invention.

By increasing the spatial frequency at the edge of the aperture and increasing the amplitude of the phase modulation with respect to the center, steeper slopes in the rejection region can also be obtained. Also, orienting the phase grating at an angle with respect to the fiber array direction will cause the unwanted diffraction orders to fall out-of-line to the fiber array, potentially improving crosstalk rejection. It should be noted, however, that the spatial frequency component in the v-groove direction needs to be equal to the nominal case. Further, placing phase masked microlenses directly adjacent to non-phase masked microlenses can ease manufacturing alignment and reduce part count logistics. For example, referring to FIG. 7, there is shown a substrate 100 having an array of microlenses formed therein. The array of microlenses is arranged into a first column 102 and a second column 104. The microlenses in the first column 102 have patterned phase masks formed therein/on, while the microlenses in the second column 104 do not have pattern phase mask formed therein/on. Thus, the substrate 100 can be shifted such that the microlenses in either the first column 102 or the second column 104 are aligned with the plurality of optical input fibers 12, as well as the corresponding plurality of patterned optical input components 14, which are arranged into one-dimensional input arrays (e.g., 1×33 arrays).

At this point it is appropriate to describe a specific working example of the demultiplexing device 40 as described above in FIG. 3 that incorporates the present invention passband profile reshaping concepts just described. Assume that the demultiplexing device 40 proposes 100 Ghz channel spacing, which results in approximately 0.8 nanometers separation between communication channels near a 1550 nanometer center wavelength. The combination of the collimating/focusing lens 16 and the reflective diffraction grating 18 creates a 55 micron focus spot spacing between the communication channels at the focal plane of the collimating/focusing lens 16. Standard optical fibers (SMF-28) have a gaussian 1/e-squared mode field diameter (MFD) of 10.6 microns at the end of optical fiber 22. The optical system of the multiplexing device 10 creates a 55 micron shift of focus spot with a 0.8 nanometer change of incident wavelength. As a result of the small ratio of 10.6 micron MFD out of 55 micron spacing, there are large gaps in coupling between communication channels and the region over which coupling is high is quite narrow. As described above, the shape of the coupling with respect to wavelength is called the passband.

Using non-phase masked microlenses (i.e., using no patterned phase masks either separate from or integrated with the microlenses) in front of both the optical fibers 12 and the optical fiber 22, the diameter of each of the plurality of narrowband optical output beams 44 can be optically reformed to a larger size. For example, the full angle divergence in radians of a gaussian beam is given by:

$$\theta = \frac{4}{\pi} \cdot \frac{\lambda}{d}$$

wherein $\lambda$ is equal to wavelength and d is equal to $MFD_{fiber}$. For a microlens focal length of 200 microns, a larger apparent mode field diameter of 37 microns can be produced as follows:

$$MFD = \theta \cdot f = \frac{4}{\pi} \cdot \frac{1.55}{10.6} \cdot 200 = 37$$

Figure 8:
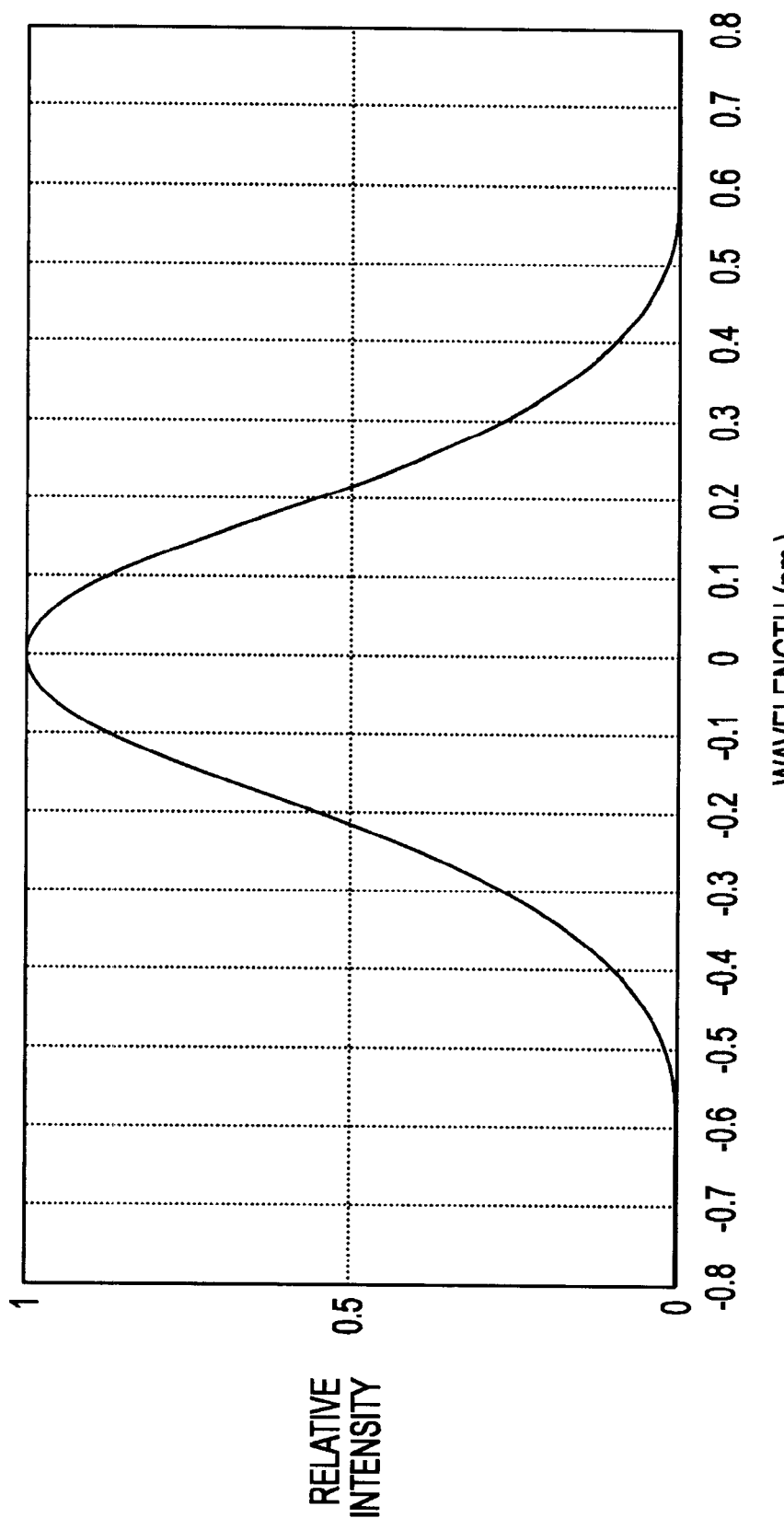
FIG. 8 is a plot of the gaussian-shaped passband profile of the improved wavelength division demultiplexing device of FIGS. 3a and 3b that is widened as a result of the use of non-phase masked microlenses.

The gaussian-shaped passband profile that is widened as a result of the above-described use of non-phase masked microlenses is shown in FIG. 8. The widened gaussian-shaped passband profile shown in FIG. 8 has the characteristics of:

Passband (1 dB down): 0.25 nm, 31 GHz

Adjacent Channel Isolation at 1 dB down point: −36.5 dB

Figure 9:
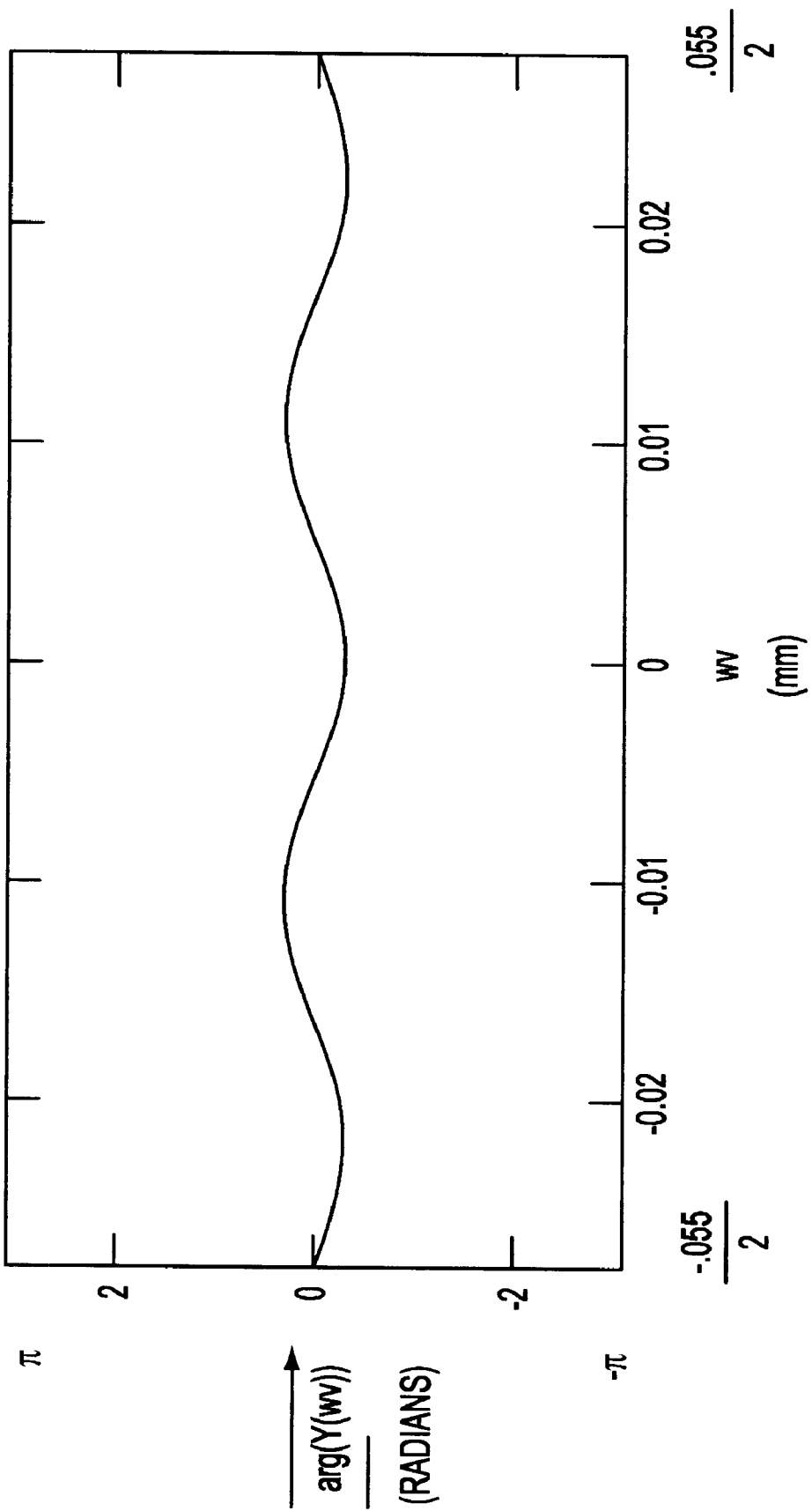
FIG. 9 is a plot of the profile of a cosinusoidal patterned phase mask in accordance with the present invention.

In accordance with the present invention, a patterned phase mask is formed on/in (or added in series with) the microlenses so as to flatten the peak of the gaussian-shaped passband profile of the demultiplexing device 40. For example, a periodic patterned phase mask may be formed on/in (or added in series with) the microlenses so as to flatten the peak of the gaussian-shaped passband profile of the demultiplexing device 40. More specifically, a cosinusoidal patterned phase mask having a period of 22 microns and amplitude of 0.1 π is formed on/in (or added in series with) the microlenses. The profile of the cosinusoidal patterned phase mask is given by the following equation:

$$Phase(x) = e^{i \cdot 0.1\pi \cdot \cos\left(\frac{x}{22} \cdot 2\pi\right)}$$

and is shown in FIG. 9, wherein arg is equal to:

$$0.1\pi \cdot \cos\left(\frac{x}{22} \cdot 2\pi\right)$$

Figure 10:
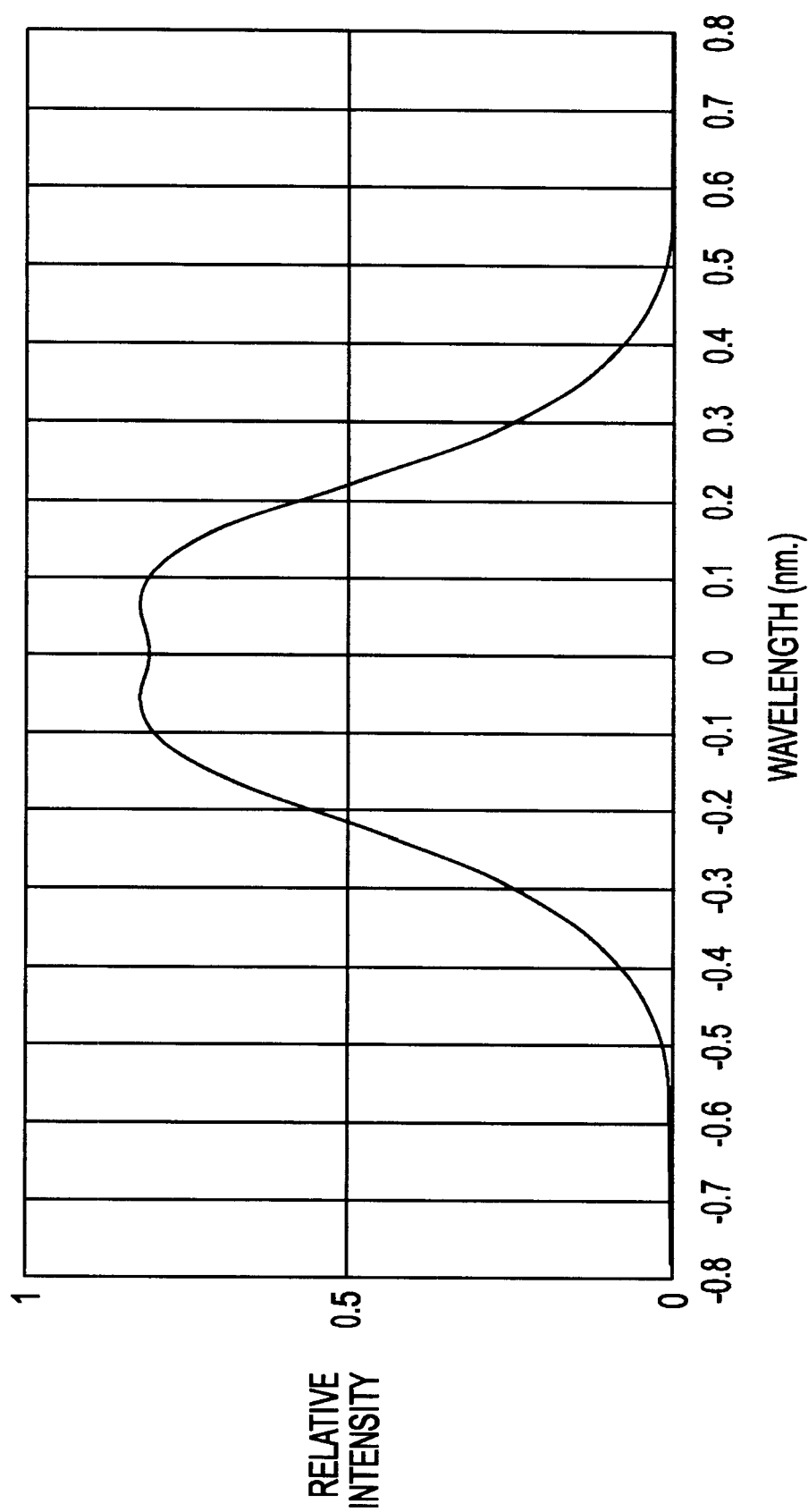
FIG. 10 is a plot of the passband profile of the improved wavelength division demultiplexing device of FIGS. 3a and 3b that is flattened as a result of the use of cosinusoidal patterned phase mask microlenses in accordance with the present invention.

The passband profile that is flattened as a result of the above-described use of cosinusoidal patterned phase mask microlenses is shown in FIG. 10. The widened and flattened passband profile shown in FIG. 10 has the characteristics of:

Passband (1 dB down): 0.338 nm, 42 GHz

Adjacent Channel Isolation at 1 dB down point: −29.7 dB

Figure 11B:
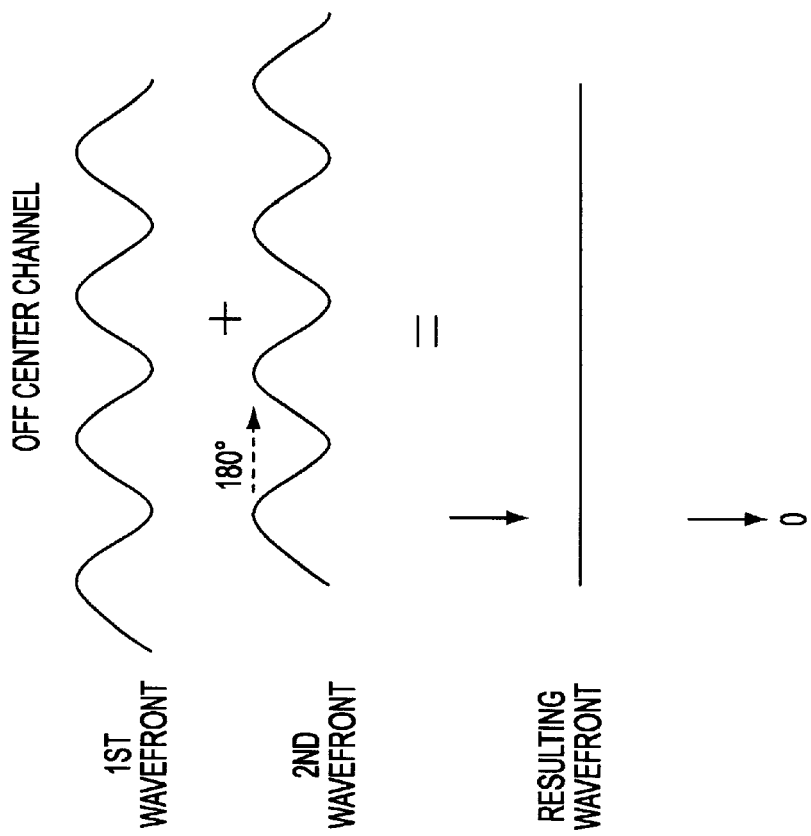
FIG. 11b indicates how the periodic wavefront profiles that are formed from the cosinusoidal patterned phase mask microlenses described in FIG. 9 are destructively canceled when they are 180 degrees out of phase off center channel in accordance with the present invention.
Figure 11A:
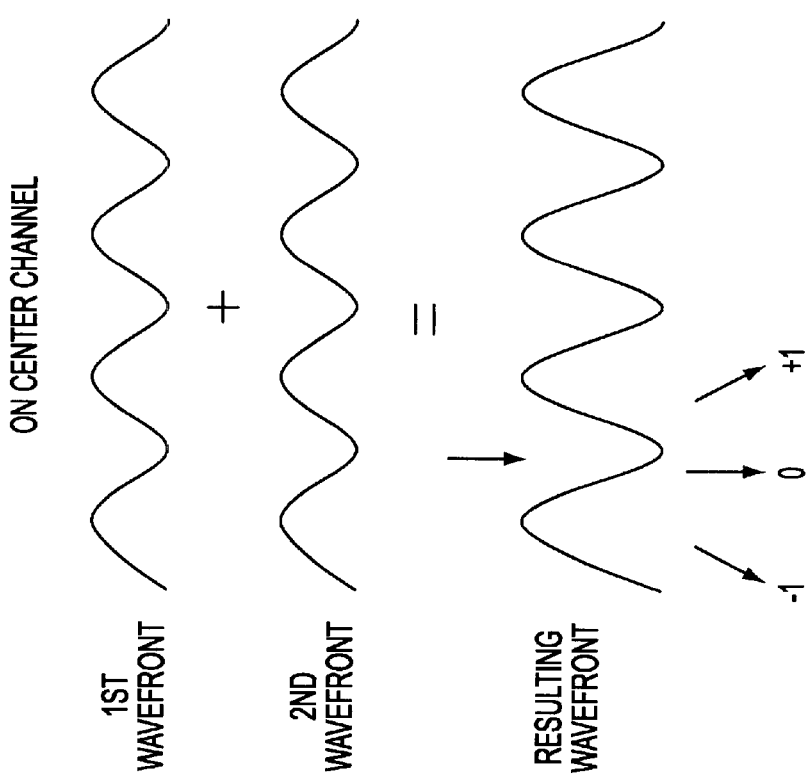
FIG. 11a indicates how the periodic wavefront profiles that are formed from the cosinusoidal patterned phase mask microlenses described in FIG. 9 are constructively added to each other when they are completely in phase on center channel, thereby diffracting the maximum amount of energy out of the receiving fiber core, in accordance with the present invention.

Referring to FIG. 11a, the periodic wavefront profiles that are formed from the cosinusoidal patterned phase mask microlenses are shown constructively adding to each other when they are completely in phase on center channel, thereby diffracting the maximum amount of energy out of the receiving fiber core. Referring to FIG. 11b, the periodic wavefront profiles are shown destructively canceling each other when they are 180 degrees out of phase off center channel. In this scenario, the image of the input phase pattern impinges out of phase on the output phase pattern. When the amount of off center wavelength shift corresponds to a 180 degree shift of the phase pattern profile, the patterns cancel, thereby coupling all of the light into the receiving fiber core.

Figure 12:
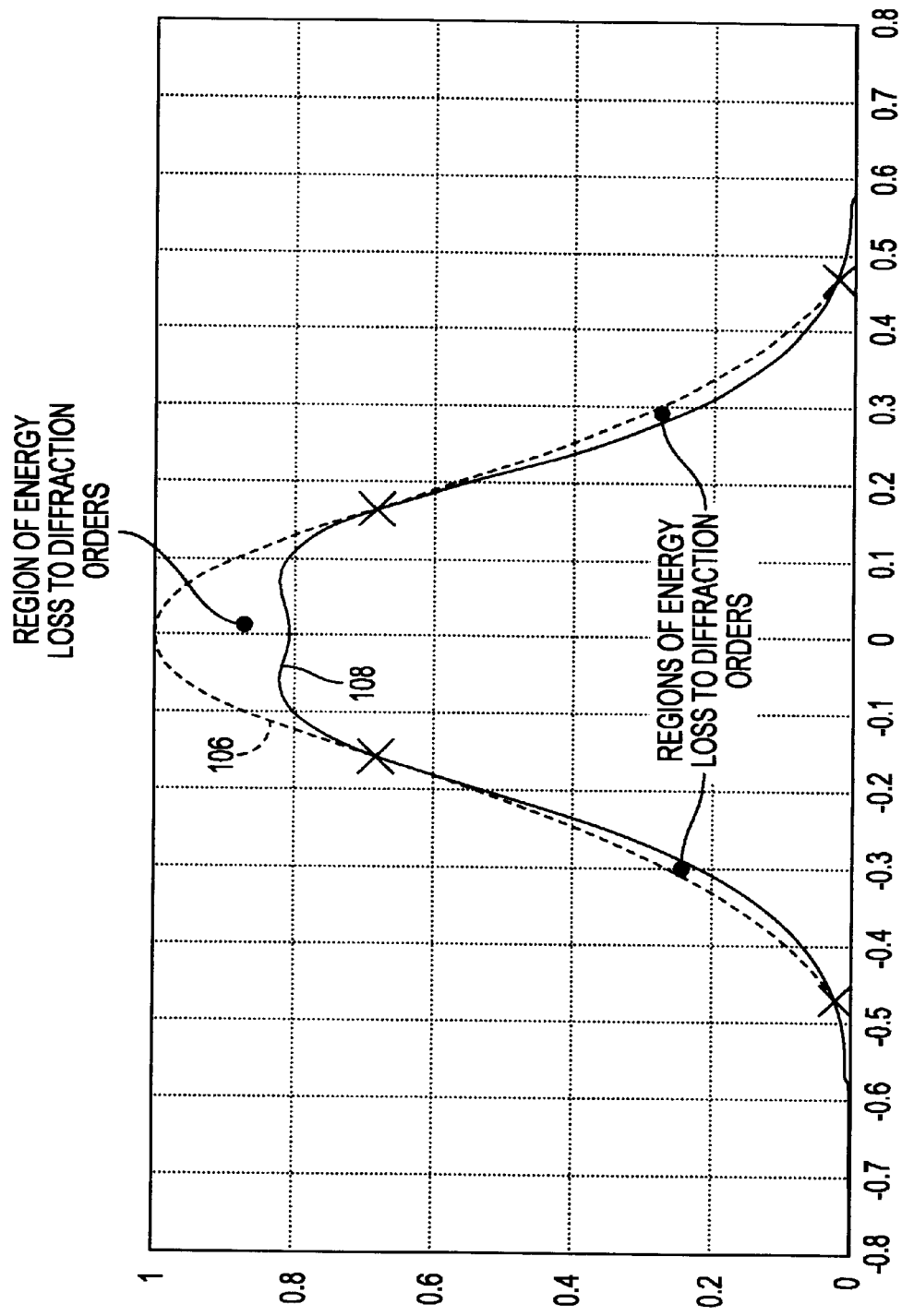
FIG. 12 shows a plot of the widened gaussian-shaped passband profile shown in FIG. 8 in comparison to a plot of the widened and flattened passband profile shown in FIG. 10.

Referring to FIG. 12, a plot of the widened gaussian-shaped passband profile 106 as shown in FIG. 8 is shown in comparison to the widened and flattened passband profile 108 as shown in FIG. 10. As can be seen from this comparison, the addition of the cosinusoidal patterned phase masks to the microlenses also causes a steepening of the sideband slopes due to energy loss in certain diffraction orders. The points where the two plots intersect (identified by the X's in FIG. 12) are where the periodic wavefront profiles destructively cancel each other when they are 180 degrees out of phase off center channel.

Figure 13:
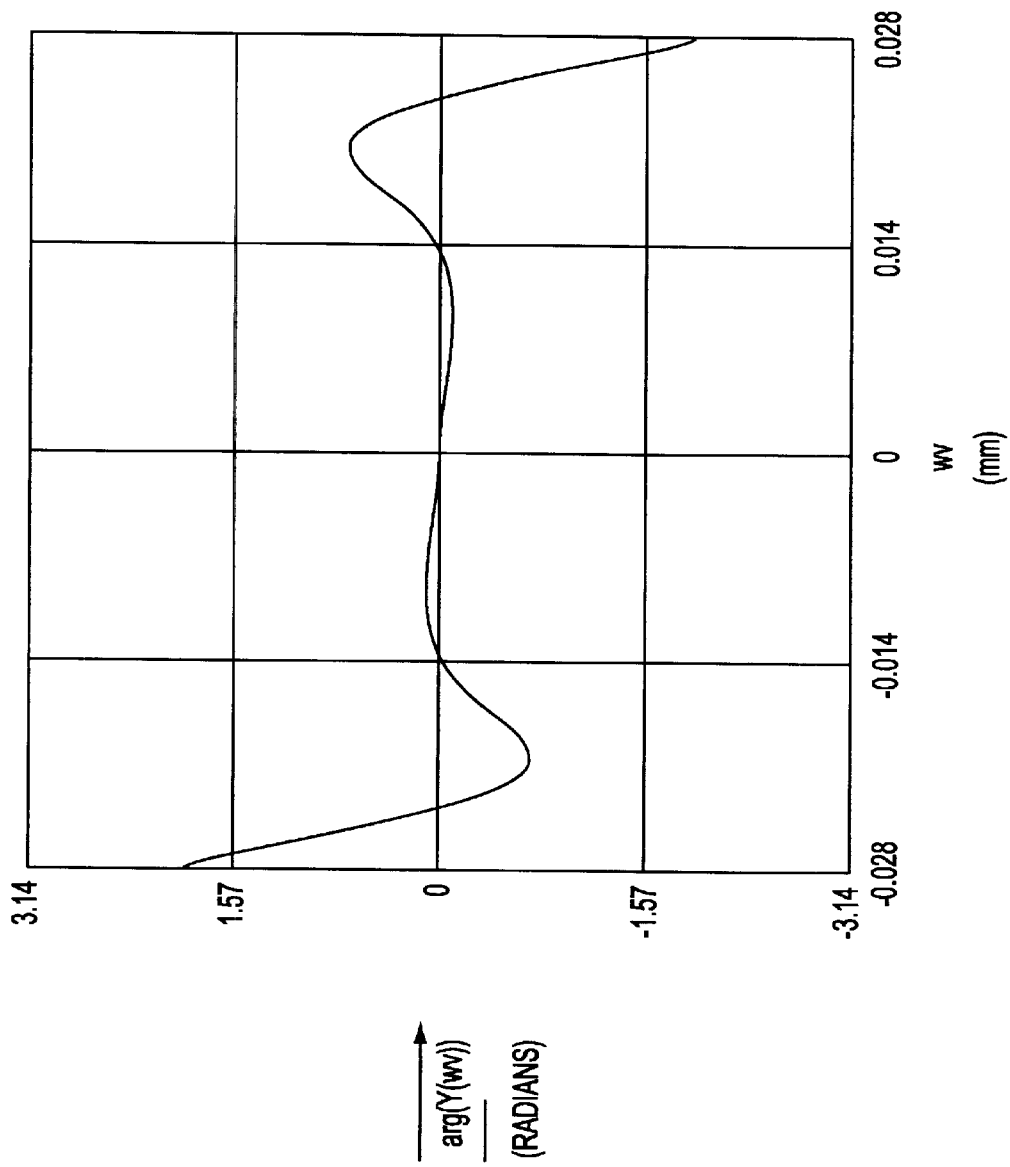
FIG. 13 is a plot of the profile of a chirped patterned phase mask in accordance with the present invention.

In accordance with the other aspects of the present invention, a non-periodic patterned phase mask may alternatively be formed on/in (or added in series with) the microlenses so as to flatten the peak of the gaussian-shaped passband profile of the demultiplexing device 40. More specifically, a chirped patterned phase mask having increasing amplitude and spatial frequency at the periphery may alternatively be formed on/in (or added in series with) the microlenses. The profile of the chirped patterned phase mask is given by the following equations:

$$Phase(x) = e^{i \cdot 0.1\pi \left[1 + (|160x|)^3\right] \cdot \left[\sin\left[\frac{x \cdot (1 + |12,000x^3|)}{27.5}\right] \cdot 2\pi\right]}$$

and is shown in FIG. 13, wherein arg is equal to:

$$0.1\pi \left[1 + (|160x|)^3\right] \cdot \left[\sin\left[\frac{x \cdot (1 + |12,000x^3|)}{27.5}\right] \cdot 2\pi\right]$$

Figure 14:
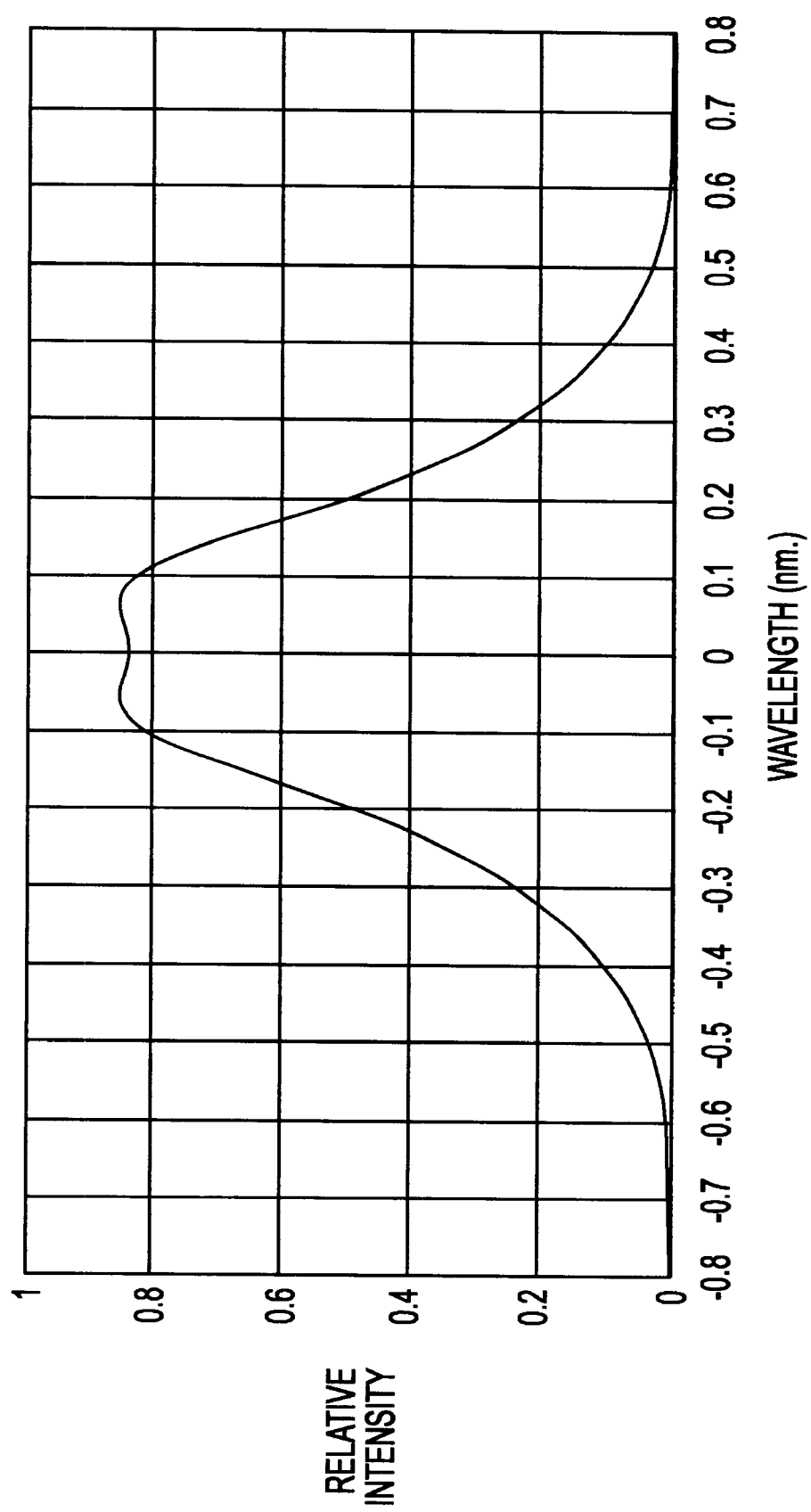
FIG. 14 is a plot of the passband profile of the improved wavelength division demultiplexing device of FIGS. 3a and 3b that is flattened as a result of the use of chirped patterned phase mask microlenses in accordance with the present invention.

The passband profile that is flattened as a result of the above-described use of chirped patterned phase mask microlenses is shown in FIG. 14. The widened and flattened passband profile shown in FIG. 14 has the characteristics of:

Passband (1 db down): 0.316 nm, 39.6 GHz

Adjacent Channel Isolation at 1 db down point: −35.8 dB

In view of the foregoing, it follows that there are many variations of periodic (e.g., sinusoidal, cosinusoidal, triangular, square, etc.), modulated periodic (e.g., combinations of periodic functions having more than one frequency), and nonperiodic (e.g., chirped, random, etc.) patterns that can be formed on/in (or added in series with) the microlenses in accordance with the present invention. Also, the depth and width of the patterned phase masks can be varied to control the amount of diffracted energy in accordance with the present invention. Further, the patterned phase masks may be designed in accordance with the present invention so as to result in the reshaping of the passband profiles of multiplexing devices in other ways than the flattening of the peak of a gaussian-shaped passband profile or the steepening of the sideband slopes of a gaussian-shaped passband profile.

At this point it should be noted that it is within the scope of the present invention to provide wavelength division multiplexing/demultiplexing devices in accordance with the present invention using any or all of the concepts and/or features described in U.S. Pat. No. 5,999,672, issued Dec. 7, 1999; U.S. Pat. No. 6,011,884, Jan. 4, 2000; U.S. patent application No. 09/257,045, filed Feb. 25, 1999; U.S. patent application No. 09/323,094, filed Jun. 1, 1999; U.S. patent application No. 09/342,142, filed Jun. 29, 1999; U.S. patent application No. 09/382,492, filed Aug. 25, 1999; U.S. patent application No. 09/382,624, filed Aug. 25, 1999; U.S. patent application No. 09/363,041, filed Jul. 29, 1999; U.S. patent application No. 09/363,042, filed Jul. 29, 1999; U.S. patent application No. 09/392,760, filed Sep. 8, 1999; U.S. patent application No. 09/392,831, filed Sep. 8, 1999; and U.S. patent application No. 09/583,764, filed May 31, 2000; all of which are hereby incorporated herein by reference. For example, an wavelength division multiplexing/demultiplexing device in accordance with the present invention may be wholly or partially integrated, and difference types of lenses and lens configurations may be used.

In summary, the present invention comprises patterned phase masks that are formed in/on or added in series with microlenses that are attached or disposed adjacent to the ends of optical fibers in wavelength division multiplexing/demultiplexing devices. In any case, the patterned phase masks are preferably placed at the focus of the main collimating/focusing lens of the wavelength division multiplexing/demultiplexing device.

The microlenses are used to widen a gaussian-shaped passband profile. The patterned phase masks cause energy to be diffracted in certain locations within the passband profile, thereby selectively reducing the amount of energy that is coupled into the core of the receiving optical fiber. That is, at certain locations within the passband profile, the patterned phase masks cause either constructive or destructive interference to occur as incident wavelength varies over the passband profile. The constructive interference results in more diffracted energy (and thus a greater reduction in the amount of total energy at selected locations in the passband profile), while the destructive interference results in less diffracted energy (and thus a lesser reduction in the amount of total energy at selected locations in the passband profile). Also, the depth and width of the patterned phase masks can be varied to control the amount of diffracted energy.

In the specific exemplary embodiment described herein, constructive interference is used to reduce the transmitted energy efficiency at the center and edges of the passband profile, thereby flattening the peak of a gaussian-shaped passband profile and steepening the sideband slopes of a gaussian-shaped passband profile. That is, energy is discarded at the center and edges of the gaussian-shaped passband profile with respect to the shoulders of the desired passband shape. The amount of energy that is discarded at the center of the passband profile is tailored to match the inverse of the peak of the gaussian-shaped passband profile. Despite the particular application and results described above, the overall advantage of the present invention is the ability to vary the amount of the effect over the width of the passband profile.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. An improved wavelength division multiplexing device having a diffraction grating for combining a plurality of narrowband optical beams into a multiplexed, polychromatic optical beam, the plurality of narrowband optical beams being received from a corresponding plurality of optical sources, the multiplexed, polychromatic optical beam being transmitted to a corresponding optical receiver, the improvement comprising:

a plurality of patterned optical input components corresponding to the plurality of narrowband optical beams and the plurality of optical sources for introducing a first patterned phase delay into the plurality of narrowband optical beams, each of the plurality of patterned optical input components having an effective focal length such that each of the plurality of optical sources is disposed substantially inside the effective focal length of a corresponding one of the plurality of patterned optical input components;

a patterned optical output component corresponding to the multiplexed, polychromatic optical beam and the optical receiver for introducing a second patterned phase delay into the multiplexed, polychromatic optical beam, the patterned optical output component having an effective focal length such that the optical receiver is disposed substantially inside the effective focal length of the patterned optical output component;

wherein the first patterned phase delay and the second patterned phase delay are added so as to reshape the passband of the improved wavelength division multiplexing device.

2. The improved wavelength division multiplexing device as defined in claim 1, wherein the effective focal length of each of the plurality of patterned optical input components is the same.

3. The improved wavelength division multiplexing device as defined in claim 2, wherein the effective focal length of each of the plurality of patterned optical input components is derived from a quadratic phase term that is inherent in each of the plurality of patterned optical input components.

4. The improved wavelength division multiplexing device as defined in claim 2, wherein the effective focal length of the patterned optical output component is the same as the effective focal length of each of the plurality of patterned optical input components.

5. The improved wavelength division multiplexing device as defined in claim 4, wherein the effective focal length of the patterned optical output component is derived from a quadratic phase term that is inherent in the patterned optical output component.

6. The improved wavelength division multiplexing device as defined in claim 1, wherein the effective focal length of each of the plurality of patterned optical input components differs.

7. The improved wavelength division multiplexing device as defined in claim 6, wherein the effective focal length of the patterned optical output component differs from the effective focal length of each of the plurality of patterned optical input components.

8. The improved wavelength division multiplexing device as defined in claim 1, wherein at least some of the plurality of patterned optical input components and the patterned optical output component are formed on a common substrate.

9. The improved wavelength division multiplexing device as defined in claim 1, wherein each of the plurality of optical sources is one of an optical input fiber and a laser diode.

10. The improved wavelength division multiplexing device as defined in claim 1, wherein each of the plurality of optical sources is an optical input fiber.

11. The improved wavelength division multiplexing device as defined in claim 10, wherein each of the plurality of narrowband optical beams is received from a corresponding one of the plurality of optical input fibers, wherein each of the plurality of optical input fibers is disposed from a corresponding one of the plurality of patterned optical input components at a distance defined by:

$$x = \frac{f}{2} + \frac{1}{4} \cdot \sqrt{4 \cdot f^2 - \frac{\pi^2 \cdot do^4}{\lambda^2}}$$

wherein f is the effective focal length of the corresponding one of the plurality of patterned optical input components, $d_o$ is a Gaussian mode field diameter of the optical input fiber, and $\lambda$ is the wavelength associated with the narrowband optical beam being received from the optical input fiber.

12. The improved wavelength division multiplexing device as defined in claim 11, wherein the distance between each of the plurality of optical input fibers and each corresponding one of the plurality of patterned optical input components varies with wavelength.

13. The improved wavelength division multiplexing device as defined in claim 11, wherein the effective focal length of each of the plurality of patterned optical input components differs so that the distance between each of the plurality of optical input fibers and each corresponding one of the plurality of patterned optical input components does not vary with wavelength.

14. The improved wavelength division multiplexing device as defined in claim 1, wherein the optical receiver is an optical output fiber.

15. The improved wavelength division multiplexing device as defined in claim 14, wherein the multiplexed, polychromatic optical beam is transmitted to the optical output fiber, wherein the optical output fiber is disposed from the corresponding patterned optical output component at a distance defined by:

$$x = \frac{f}{2} + \frac{1}{4} \cdot \sqrt{4 \cdot f^2 - \frac{\pi^2 \cdot do^4}{\lambda^2}}$$

wherein f is the effective focal length of the corresponding patterned optical output component, $d_o$ is a Gaussian mode field diameter of the optical output fiber, and $\lambda$ is the average wavelength associated with the multiplexed, polychromatic optical beam being transmitted to the optical output fiber.

16. The improved wavelength division multiplexing device as defined in claim 1, wherein the spacing between each of the plurality of optical sources, as well as the spacing between each of the corresponding plurality of patterned optical input components, increases as the difference between the wavelengths associated with each of the plurality of narrowband optical beams being received from corresponding ones of the plurality of optical sources increases.

17. The improved wavelength division multiplexing device as defined in claim 1, wherein the plurality of patterned optical input components comprises:
a plurality of patterned phase masks, each of the plurality of patterned phase masks for introducing the first patterned phase delay into a corresponding one of the plurality of narrowband optical beams.

18. The improved wavelength division multiplexing device as defined in claim 17, wherein each of the plurality of patterned phase masks is formed on a corresponding collimating microlens.

19. The improved wavelength division multiplexing device as defined in claim 17, wherein each of the plurality of patterned phase masks is formed in a corresponding collimating microlens.

20. The improved wavelength division multiplexing device as defined in claim 17, wherein the plurality of patterned optical input components further comprises:
a plurality of collimating microlenses, each of the plurality of collimating microlenses for collimating a corresponding one of the plurality of narrowband optical beams.

21. The improved wavelength division multiplexing device as defined in claim 17, wherein each of the plurality of patterned phase masks has a periodic phase profile.

22. The improved wavelength division multiplexing device as defined in claim 21, wherein the passband of the improved wavelength division multiplexing device is a gaussian-shaped passband having a peak, wherein the periodic phase profile of each patterned phase mask contributes to a flattening of the peak of the gaussian-shaped passband of the improved wavelength division multiplexing device.

23. The improved wavelength division multiplexing device as defined in claim 21, wherein the passband of the improved wavelength division multiplexing device is a gaussian-shaped passband having sideband slopes, wherein the periodic phase profile of each patterned phase mask contributes to a steepening of the sideband slopes of the gaussian-shaped passband of the improved wavelength division multiplexing device.

24. The improved wavelength division multiplexing device as defined in claim 17, wherein each of the plurality of patterned phase masks has a non-periodic phase profile.

25. The improved wavelength division multiplexing device as defined in claim 24, wherein the passband of the improved wavelength division multiplexing device is a gaussian-shaped passband having a peak, wherein the non-periodic phase profile of each patterned phase mask contributes to a flattening of the peak of the gaussian-shaped passband of the improved wavelength division multiplexing device.

26. The improved wavelength division multiplexing device as defined in claim 24, wherein the passband of the improved wavelength division multiplexing device is a gaussian-shaped passband having sideband slopes, wherein the non-periodic phase profile of each patterned phase mask contributes to a steepening of the sideband slopes of the gaussian-shaped passband of the improved wavelength division multiplexing device.

27. The improved wavelength division multiplexing device as defined in claim 17, wherein each of the plurality of patterned phase masks has a modulated periodic phase profile.

28. The improved wavelength division multiplexing device as defined in claim 1, wherein the patterned optical output components comprises:
a patterned phase mask for introducing the second patterned phase delay into the multiplexed, polychromatic optical beam.

29. The improved wavelength division multiplexing device as defined, in claim 28, wherein the patterned phase mask is formed on a focusing microlens.

30. The improved wavelength division multiplexing device as defined in claim 28, wherein the patterned phase mask is formed in a focusing microlens.

31. The improved wavelength division multiplexing device as defined in claim 28, wherein the patterned optical output component further comprises:
a focusing microlens for focusing the multiplexed, polychromatic optical beam.

32. The improved wavelength division multiplexing device as defined in claim 28, wherein the patterned phase mask has a periodic phase profile.

33. The improved wavelength division multiplexing device as defined in claim 32, wherein the passband of the improved wavelength division multiplexing device is a gaussian-shaped passband having a peak, wherein the periodic phase profile of the patterned phase mask contributes to a flattening of the peak of the gaussian-shaped passband of the improved wavelength division multiplexing device.

34. The improved wavelength division multiplexing device as defined in claim 32, wherein the passband of the improved wavelength division multiplexing device is a gaussian-shaped passband having sideband slopes, wherein the periodic phase profile of the patterned phase mask contributes to a steepening of the sideband slopes of the gaussian-shaped pass band of the improved wavelength division multiplexing device.

35. The improved wavelength division multiplexing device as defined in claim 28, wherein the patterned phase mask has a non-periodic phase profile.

36. The improved wavelength division multiplexing device as defined in claim 35, wherein the passband of the improved wavelength division multiplexing device is a gaussian-shaped passband having a peak, wherein the non-periodic phase profile of the patterned phase mask contributes to a flattening of the peak of the gaussian-shaped passband of the improved wavelength division multiplexing device.

37. The improved wavelength division multiplexing device as defined in claim 35, wherein the passband of the improved wavelength division multiplexing device is a gaussian-shaped passband having sideband slopes, wherein the non-periodic phase profile of the patterned phase mask contributes to a steepening of the sideband slopes of the gaussian-shaped passband of the improved wavelength division multiplexing device.

38. The improved wavelength division multiplexing device as defined in claim 28, wherein the patterned phase mask has a modulated periodic phase profile.

39. An improved wavelength division demultiplexing device having a diffraction grating for separating a multiplexed, polychromatic optical beam into a plurality of narrowband optical beams, the multiplexed, polychromatic optical beam being received from a corresponding optical source, the plurality of narrowband optical beams being transmitted to a corresponding plurality of optical receivers, the improvement comprising:
a patterned optical input component corresponding to the multiplexed, polychromatic optical beam and the optical source for introducing a first patterned phase delay into the multiplexed, polychromatic optical beam, the patterned optical input component having an effective focal length such that the optical source is disposed substantially inside the effective focal length of the patterned optical input component; and
a plurality of patterned optical output components corresponding to the plurality of narrowband optical beams and the plurality of optical receivers for introducing a second patterned phase delay into the plurality of narrowband optical beams, each of the plurality of patterned optical output components having an effective focal length such that each of the plurality of optical receivers is disposed substantially inside the effective focal length of a corresponding one of the plurality of patterned optical output components;
wherein the first patterned phase delay and the second patterned phase delay are added so as to reshape the passband of the improved wavelength division demultiplexing device.

40. The improved wavelength division demultiplexing device as defined in claim 39, wherein the effective focal length of each of the plurality of patterned optical output components is the same.

41. The improved wavelength division demultiplexing device as defined in claim 40, wherein the effective focal length of each of the plurality of patterned optical output components is derived from a quadratic phase term that is inherent in each of the plurality of patterned optical output components.

42. The improved wavelength division demultiplexing device as defined in claim 40, wherein the effective focal length of the patterned optical input component is the same as the effective focal length of each of the plurality of patterned optical output components.

43. The improved wavelength division demultiplexing device as defined in claim 42, wherein the effective focal length of the patterned optical input component is derived from a quadratic phase term that is inherent in the patterned optical input component.

44. The improved wavelength division demultiplexing device as defined in claim 39, wherein the effective focal length of each of the plurality of patterned optical output components differs.

45. The improved wavelength division demultiplexing device as defined in claim 44, wherein the effective focal length of the patterned optical input component differs from the effective focal length of each of the plurality of patterned optical output components.

46. The improved wavelength division demultiplexing device as defined in claim 39, wherein at least some of the plurality of patterned optical output components and the patterned optical input component are formed on a common substrate.

47. The improved wavelength division demultiplexing device as defined in claim 39, wherein each of the plurality of optical receivers is one of an optical output fiber and a photodiode.

48. The improved wavelength division demultiplexing device as defined in claim 39, wherein each of the plurality of optical receivers is an optical output fiber.

49. The improved wavelength division demultiplexing device as defined in claim 48, wherein each of the plurality of narrowband optical beams is transmitted to a corresponding one of the plurality of optical output fibers, wherein each of the plurality of optical output fibers is disposed from a corresponding one of the plurality of patterned optical output components at a distance defined by:

$$x = \frac{f}{2} + \frac{1}{4} \cdot \sqrt{4 \cdot f^2 - \frac{\pi^2 \cdot do^4}{\lambda^2}}$$

wherein f is the effective focal length of the corresponding one of the plurality of patterned optical output components, $d_o$ is a Gaussian mode field diameter of the optical output fiber, and λ is the wavelength associated with the narrowband optical beam being transmitted to the optical output fiber.

50. The improved wavelength division demultiplexing device as defined in claim 49, wherein the distance between each of the plurality of optical output fibers and each corresponding one of the plurality of patterned optical output components varies with wavelength.

51. The improved wavelength division demultiplexing device as defined in claim 49, wherein the effective focal length of each of the plurality of patterned optical output components differs so that the distance between each of the plurality of optical output fibers and each corresponding one of the plurality of patterned optical output components does not vary with wavelength.

52. The improved wavelength division demultiplexing device as defined in claim 39, wherein the optical source is an optical input fiber.

53. The improved wavelength division demultiplexing device as defined in claim 52, wherein the multiplexed, polychromatic optical beam is received from the optical input fiber, wherein the optical input fiber is disposed from the corresponding patterned optical input component at a distance defined by:

$$x = \frac{f}{2} + \frac{1}{4} \cdot \sqrt{4 \cdot f^2 - \frac{\pi^2 \cdot do^4}{\lambda^2}}$$

wherein f is the effective focal length of the corresponding patterned optical input component, $d_o$ is a Gaussian mode field diameter of the optical input fiber, and λ is the average wavelength associated with the multiplexed, polychromatic optical beam being received from the optical input fiber.

54. The improved wavelength division demultiplexing device as defined in claim 39, wherein the spacing between each of the plurality of optical receivers, as well as the spacing between each of the corresponding plurality of patterned optical output components, increases as the difference between the wavelengths associated with each of the plurality of narrowband optical beams being transmitted to corresponding ones of the plurality of optical receivers increases.

55. The improved wavelength division demultiplexing device as defined in claim 39, wherein the patterned optical input component comprises:
    a patterned phase mask for introducing the first patterned phase delay into the multiplexed, polychromatic optical beam.

56. The improved wavelength division demultiplexing device as defined in claim 55, wherein the patterned phase mask is formed on a collimating microlens.

57. The improved wavelength division demultiplexing device as defined in claim 55, wherein the patterned phase mask is formed in a collimating microlens.

58. The improved wavelength division demultiplexing device as defined in claim 55, wherein the patterned optical output component further comprises:
    a collimating microlens for collimating the multiplexed, polychromatic optical beam.

59. The improved wavelength division demultiplexing device as defined in claim 55, wherein the patterned phase mask has a periodic phase profile.

60. The improved wavelength division demultiplexing device as defined in claim 59, wherein the passband of the improved wavelength division demultiplexing device is a gaussian-shaped passband having a peak, wherein the periodic phase profile of the patterned phase mask contributes to a flattening of the peak of the gaussian-shaped passband of the improved wavelength division demultiplexing device.

61. The improved wavelength division demultiplexing device as defined in claim 59, wherein the passband of the improved wavelength division demultiplexing device is a gaussian-shaped passband having sideband slopes, wherein the periodic phase profile of the patterned phase mask contributes to a steepening of the sideband slopes of the gaussian-shaped passband of the improved wavelength division demultiplexing device.

62. The improve wavelength division demultiplexing device as defined in claim 55, wherein the patterned phase mask has a non-periodic phase profile.

63. The improved wavelength division demultiplexing device as defined in claim 62, wherein the passband of the improved wavelength division demultiplexing device is a gaussian-shaped passband having a peak, wherein the non-periodic phase profile of the patterned phase mask contributes to a flattening of the peak of the gaussian-shaped passband of the improved wavelength division demultiplexing device.

64. The improved wavelength division demultiplexing device as defined in claim 63, wherein the passband of the improved wavelength division demultiplexing device is a gaussian-shaped passband having sideband slopes, wherein the non-periodic phase profile of the patterned phase mask contributes to a steepening of the sideband slopes of the gaussian-shaped passband of the improved wavelength division demultiplexing device.

65. The improved wavelength division demultiplexing device as defined in claim 55, wherein the patterned phase mask has a modulated periodic phase profile.

66. The improved wavelength division demultiplexing device as defined in claim 39, wherein the plurality of patterned optical output components comprises:
    a plurality of patterned phase masks, each of the plurality of patterned phase masks for introducing the second patterned phase delay into a corresponding one of the plurality of narrowband optical beams.

67. The improved wavelength division demultiplexing device as defined in claim 66, wherein each of the plurality of patterned phase masks is formed on a corresponding focusing microlens.

68. The improved wavelength division demultiplexing device as defined in claim 66, wherein each of the plurality of patterned phase masks is formed in a corresponding focusing microlens.

69. The improved wavelength division demultiplexing device as defined in claim 66, wherein the plurality of patterned optical output components further comprises:
    a plurality of focusing microlenses, each of the plurality of focusing microlenses for focusing a corresponding one of the plurality of narrowband optical beams.

70. The improved wavelength division demultiplexing device as defined in claim 66, wherein each of the plurality of patterned phase masks has a periodic phase profile.

71. The improved wavelength division demultiplexing device as defined in claim 70, wherein the passband of the improved wavelength division demultiplexing device is a gaussian-shaped passband having a peak, wherein the periodic phase profile of each patterned phase mask contributes to a flattening of the peak of the gaussian-shaped passband of the improved wavelength division demultiplexing device.

72. The improved wavelength division demultiplexing device as defined in claim 70, wherein the passband of the improved wavelength division demultiplexing device is a gaussian-shaped passband having sideband slopes, wherein the periodic phase profile of each patterned phase mask contributes to a steepening of the sideband slopes of the gaussian-shaped passband of the improved wavelength division demultiplexing device.

73. The improved wavelength division demultiplexing device as defined in claim 66, wherein each of the plurality of patterned phase masks has a non-periodic phase profile.

74. The improved wavelength division demultiplexing device as defined in claim 73, wherein the passband of the improved wavelength division demultiplexing device is a gaussian-shaped passband having a peak, wherein the non-periodic phase profile of each patterned phase mask contributes to a flattening of the peak of the gaussian-shaped passband of the improved wavelength division demultiplexing device.

75. The improved wavelength division demultiplexing device as defined in claim 73, wherein the passband of the improved wavelength division demultiplexing device is a gaussian-shaped passband having sideband slopes, wherein the non-periodic phase profile of each patterned phase mask contributes to a steepening of the sideband slopes of the gaussian-shaped passband of the improved wavelength division demultiplexing device.

76. The improved wavelength division demultiplexing device as defined in claim 66, wherein each of the plurality of patterned phase masks has a modulated periodic phase profile.

* * * * *